(12) United States Patent
Tackett et al.

(10) Patent No.: US 6,314,410 B1
(45) Date of Patent: *Nov. 6, 2001

(54) SYSTEM AND METHOD FOR IDENTIFYING THE CONTEXT OF A STATEMENT MADE TO A VIRTUAL ROBOT

(75) Inventors: Walter A. Tackett, San Francisco; Scott S. Benson, Burlingame; Ray S. Dillinger, Novato, all of CA (US)

(73) Assignee: Nativeminds, Inc., San Francisco, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,322

(22) Filed: Apr. 27, 1998

Related U.S. Application Data

(63) Continuation-in-part of application No. 09/018,213, filed on Feb. 3, 1998, which is a continuation-in-part of application No. 08/868,713, filed on Jun. 4, 1997.

(51) Int. Cl.[7] .................................................... G06F 9/445
(52) U.S. Cl. ............................................................ 706/11
(58) Field of Search ................................. 706/11, 45–47, 706/50, 927

(56) References Cited

U.S. PATENT DOCUMENTS

| 5,161,110 | 11/1992 | Dorchak | 700/108 |
| 5,371,807 | * 12/1994 | Register et al. | 382/159 |
| 5,384,893 | 1/1995 | Hutchins | 704/267 |
| 5,442,786 | 8/1995 | Bowen | 707/102 |
| 5,526,407 | 6/1996 | Russell et al. | 379/88.01 |
| 5,535,323 | * 7/1996 | Miller et al. | 345/338 |
| 5,553,218 | 9/1996 | Li et al. | 707/102 |
| 5,568,639 | 10/1996 | Wilcox et al. | 707/200 |
| 5,587,903 | 12/1996 | Yale et al. | 704/9 |
| 5,600,765 | 2/1997 | Ando et al. | 345/433 |
| 5,606,712 | 2/1997 | Hidaka | 712/1 |
| 5,682,539 | * 10/1997 | Conrad et al. | 707/9 |
| 5,712,987 | 1/1998 | Waits et al. | 705/10 |

(List continued on next page.)

OTHER PUBLICATIONS

Microsoft, Getting Results with Microsoft Office 97, 35–40, 1995.*
Kaplan, R.. (1975). "A General Syntactic Processor" In *Natural Language Processing*. R. Rustin ed., Algorithmics Press, Inc., pp. 193–241.
Reichman, R.. (1978). "Conversational Coherency," *Cognitive Science* 2:283–327.
Sidner, C.L.. (1985). "Plan Parsing For Intended Response Recongnition in Discourse," *Comput Intell* 1:1–10.
Cohen, R..(1987). "Analyzing the Structure of Argumentative Discourse," *Computatioal Linguistics* 13(1–2):11–24.

(List continued on next page.)

Primary Examiner—Mark R. Powell
Assistant Examiner—Michael B. Holmes
(74) Attorney, Agent, or Firm—Morrison & Foerster LLP

(57) ABSTRACT

In an automated interface program designed to interact and communicate with users, said program executing actions when a category among a predefined set of categories is activated, a method is disclosed for interpreting the context of a user input, the steps of said method comprising: associating subjects with categories; maintaining a list of the subjects associated with the most recently activated category; testing conditions in categories such that the condition is true if the comprises at least one subject in common with said list of subjects; and activating a set of categories, said set comprising those categories whose conditions are satisfied based on the list of subjects.

32 Claims, 8 Drawing Sheets

U.S. PATENT DOCUMENTS

| | | | |
|---|---|---|---|
| 5,758,323 | 5/1998 | Case | 704/278 |
| 5,760,768 | 6/1998 | Gram | 345/333 |
| 5,801,710 | 9/1998 | Cok et al. | 345/440 |
| 5,835,087 | 11/1998 | Herz et al. | 345/327 |
| 5,864,844 * | 1/1999 | James et al. | 707/4 |
| 5,877,759 * | 3/1999 | Bauer | 345/339 |
| 5,894,311 | 4/1999 | Jackson | 345/440 |
| 5,924,089 | 7/1999 | Mocek et al. | 707/4 |
| 5,974,405 | 10/1999 | McGuinness et al. | 706/45 |
| 5,995,921 * | 11/1999 | Richards et al. | 704/9 |
| 6,012,055 * | 1/2000 | Campbell et al. | 707/5 |

OTHER PUBLICATIONS

Grosz, B. et al.. (1987). "Team: An Experiment in the Design of Transportable Natural–Language Interfaces," *Artificial Intelligence* 32:173–243.

Litman, D. et al.. (1987). "A Plan Recognition Model for Subdialogues In Conversations," *Cognitive Science* 11:163–200.

Hirschberg, J. et al.. (1993). "Empirical Studies on the Disambiguation of Cue Phrases," *Computational Linguistics* 19(3):501–530.

Allen, J.. (1995). *Natural Language Understanding*. The Benjamin/Cummings Publishing Company, Inc., Chapter 14, pp.429–461 entitled "Local Discourse Context and Reference" and Chapter 16 entitled "Discourse Structure" pp. 503–537and Chapter 17 entitled "Defining a Conversational Agent" pp. 541–576.

Reichman, R.. (1985). *Getting Computers to Talk Like You and Me*. A Bradford Book. The MIT Press, Chapter 2, pp. 21–33, Chapter 5, pp. 67–90 and Chapter 6, pp. 155–166. (Copy attached herewith).

Grosz, B.J. and C. Sidner (1986). "Attention, Intentions, and the Structure of Discourse," *Computational Linguistics* 12(3):175–204. (Copy attached herewith).

Grosz, B. J. (1986). "The Representation and Use of Focus in a System for Understanding Dialogs" *In Readings in Natural Language Processing*. B.J. Grosz et al. eds., Morgan Kaufmann Publishers, Inc., pp. 353–362. (Copy attached herewith).

Sidner, C. L. (1986). "Focusing in the Comprehension of Definite Anaphora" *In Readings in Natural Language Processing*. B.J. Grosz et al. eds., Morgan Kaufmann Publishers, Inc., pp. 363–394. (Copy attached herewith).

* cited by examiner (Web Interface Case)

(Chat Site/Virtual World Interface Case)

SYSTEM AND METHOD FOR IDENTIFYING THE CONTEXT OF A STATEMENT MADE TO A VIRTUAL ROBOT

STATEMENT OF RELATED CASES

This current application is a continuation-in-part of Ser. No. 09/018,213, entitled "Methods for Automatically Selecting Responses for a Virtual Robot", filed Feb. 3, 1998, which itself is a continuation-in-part of Ser. No. 08/868,713, entitled "Methods for Automatically Focusing the Attention of a Virtual Robot Interacting with Users", filed Jun. 4, 1997.

BACKGROUND OF THE ART

For the purposes of the present invention, "virtual robots" (or "BOTs") are software programs that interact and/or communicate with users (human, machine or otherwise) that take actions or make responses according to input from these users. BOTs are the subject of the co-pending and co-assigned parent application entitled "Methods for Automatically Selecting Responses for a Virtual Robot", filed Feb. 3, 1998, U.S. Ser. No. 09/018,213, and incorporated by reference in its entirety herein, which itself is a continuation-in-part of a co-pending and co-assigned parent application entitled "Methods for Automatically Focusing the Attention of a Virtual Robot Interacting with Users", filed Jun. 4, 1997, U.S. Ser. No. 08/868,713, and incorporated by reference in its entirety herein. A common use of such a BOT is as an interface to a web site wherein the administrator of that site has programmed the BOT to answer simple inquiries that are typically asked by visitors to the site. The above identified application discloses a method of creating BOTs according to "scripts"—i.e. programs that are written in a very high level language that closely resembles a human natural language. These scripts embody a certain amount of information concerning the site that the administrator desires the BOT to communicate to a user during a connection session.

The above identified applications includes a variety of methods for interpreting the "context" in which a question or statement is given to the bot. These methods include a method of maintaining a focus of attention stack that orders the topics discussed by the BOT according to their relevance to the current conversation, and a method of automatically replacing pronouns in user inputs.

However, both of these methods suffer from significant disadvantages in practice. Automatic pronoun replacement is very effective for the pronouns "he", "she", "him", and "her", but does not work effectively in practice for other pronouns such as "it", "they", "that", and "you", due to the frequency with which these words are used in senses other than as pronouns. The focus of attention stack is generally successful at distinguishing among multiple answers to a single question (such as "what is it?") but lacks any effective way of deciding whether such an answer is preferable to a default response such as "I don't know." For instance, suppose there is one topic that answers the question "where is it?" if the user has been discussing Neuromedia, but no topic that answers the question "where is it?" when "it" refers to San Francisco. In this case, even if the user has been discussing San Francisco and has not mentioned Neuromedia at all, if the user then asks "what is it?" they may get a response describing the location of Neuromedia rather than the correct response, which in this case is probably "I don't know." Given that a BOT's knowledge is in practice always incomplete, such situations can repeatedly arise during the interaction of a user with a BOT.

Thus, there is a need in the art to have a method of selecting a response to a context-sensitive question or statement, and for that method to allow a question to be answered with a default answer or no answer at all, even when the identical question would get a specific answer if asked in another context.

SUMMARY OF THE INVENTION

The present invention meets these aforementioned needs by providing in a BOT script a method of testing the context of an input when deciding upon the correct response that should be given to an input. In an automated interface program designed to interact and communicate with users, said program executing actions when a category among a predefined set of categories is activated, a method is disclosed for testing the context of an input when selecting a category to activate, the steps of said method comprising:

(a) associating subjects with categories;

(b) maintaining a list of the subjects associated with the most recently activated category;

(c) testing conditions in categories such that the condition is satisfied if the category comprises at least one subject in common with said list of subjects;

(d) activating a set of categories, said set comprising those categories whose conditions are satisfied in step (c).

Other aspects of the category selection mechanism are disclosed in the description given below when read in conjunction with the accompanying figures.

DETAILED DESCRIPTION OF THE INVENTION

I. OVERVIEW AND GENERAL ARCHITECTURE

The term "robot" is used interchangeably with "BOT" throughout the remainder of this application. For the purposes of the present invention, both "BOT" and "robot" refer to any program which interacts with a user in some fashion, and should not be assumed to refer only to physically embodied robots.

Figure 1:
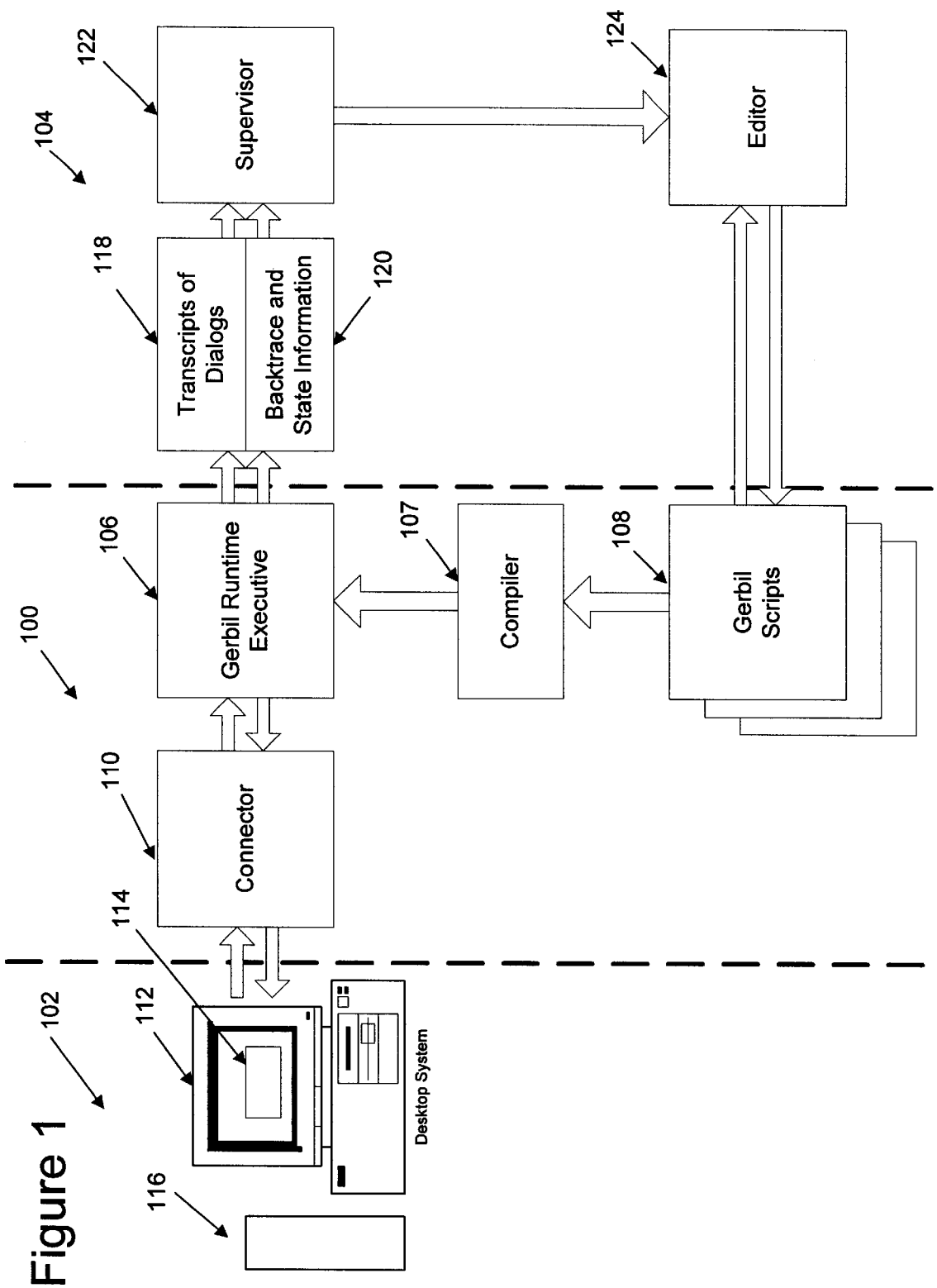
FIG. 1 depicts a suitable operating environment for the purposes of the present invention.

Referring now to FIG. 1, the operating environment of the present invention is depicted. The environment can be characterized generally into three partitions: front end 102; BOT processor 100; and back end 104. Front end 102 is generally the environment in which a human user 116 consults a vial BOT interface 114 via a computer 112 that may be connected to the BOT processor via a communications link, such as through a server connected to the Internet or alternatively directly connected to BOT processor 100. It will be appreciated that many other means of connection to BOT processor 100 are well known to those skilled in the art and that the present invention should not be limited to the any particular aspects of the general operating environment as disclosed herein.

Typically, human user 116 connects to a site whose interface of first impression is a virtual BOT interface 114. The advantage for the site developer is that human user 116 may have a help or information request that is easily handled via BOT interface 114. Today, it is not uncommon to find sites having a list of FAQs ("Frequently Asked Questions") that serve this purpose of handling very low level user concerns and questions. However, for more advanced questions or interactions with the site, virtual BOTs will become increasingly popular.

In the operating environment of this embodiment of the present invention, BOT interface 114 is an instantiation of a process that is spawned by BOT processor 100 via connection 110. BOT processor 100 itself may comprise connection 110; runtime executive process 106, compiler 107, and a set of BOT programs 108. As users 116 log onto a site having BOT processor 100 via connection 110, runtime executive 106 executes an interaction routine that guides the discussion that occurs between user 116 and BOT processor 100. Typically, a two way communications dialogue occurs between user 116 and BOT processor 100 wherein user 116 may ask questions, make declarative statements and other normal communications patterns that humans typify. For the purposes of the present invention, "communications" is to be very broadly interpreted. Indeed, suitable communications could be in the form of written or spoken language, graphics, URL's or the like that may be passed to and from a user to an automatic interface program, such as the present invention.

In turn, runtime executive 106 parses the statements and questions generated by the user and responds according to a set of BOT programs 108. As will be discussed in greater detail, BOT programs 108 are typically created at the back end 104 as a set of "scripts" that the BOT processor will tend to engage in with user 116. For example, if the site using BOT processor 100 is a site for a reseller of personal computers, then BOT processor 100 should be designed to handle questions and discussions concerning personal computers and their peripherals in general. Thus, the back end 104 will generate scripts that will guide the discussion concerning many computer-related topics. These script programs 108 are then compiled by compiler 107 and the compiled code is incorporated into runtime executive 106. As will be discussed below, these scripts are written in an English-like language called "Gerbil™"—the name derived from "General Robot Building Language", as developed by the present assignee, Neuromedia, Inc.

As the two-way discussions between user 116 and runtime executive 106 continue, it is generally desirable to engage in quality control of BOT processor 100. This quality control is provided at back end 104 via feedback loop comprising a transcript of dialogues 118 and backtrace and state information 120 of the BOT processor 100; a supervisor 122 and editor 124. As transcripts develop over the course of interacting with a user, the text of these transcripts are stored, together with the state of the runtime executive and backtrace of execution through the runtime executive code. This information forms the basis for accurately diagnosing the runtime executive and for debugging its performance. Such information may be stored electronically in a storage media or could be printed out in human readable form.

Supervisor 122 analyzes the information at 118 and 120 with an eye towards optimizing the performance of the runtime executive. Typically, supervisor 122 could be another human, deciding if the semantics captured by the system needs to be upgraded in response to a dialog transcript that has occurred. If so, supervisor 122 could optionally invoke an editor 124 to edit the Gerbil programs that represent the semantic framework of the runtime executive. These programs would then be re-complied and incorporated into the runtime executive. Supervisor 122 could be a software program (as opposed to another human) that would automatically seek to analyze the performance of the runtime executive and make corrections to the runtime executive through the editing process.

Figure 2:
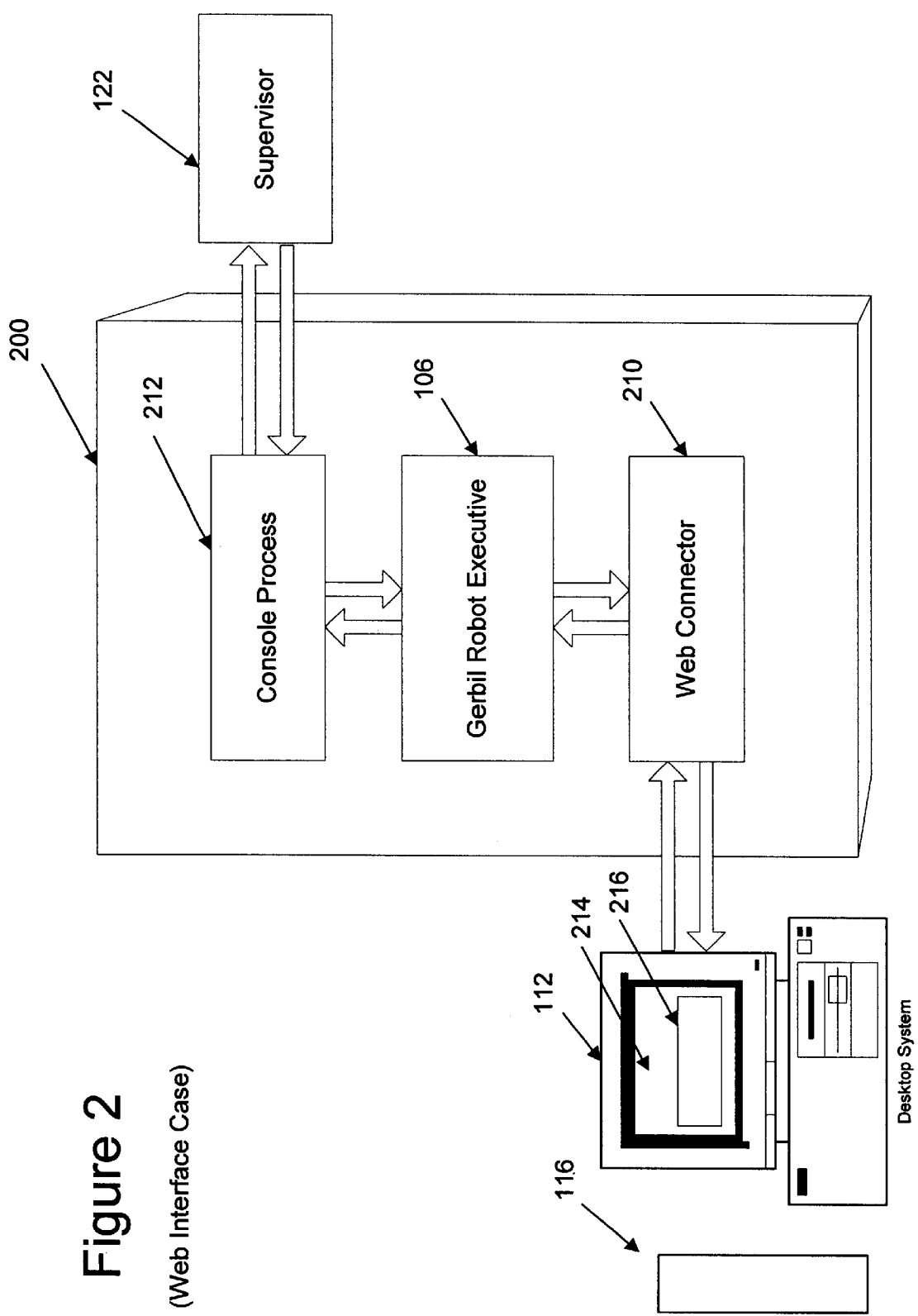
FIG. 2 depicts different operating environments for the purposes of the present invention wherein the connection to user 116 is via an intranet or internet connection.
Figure 3:
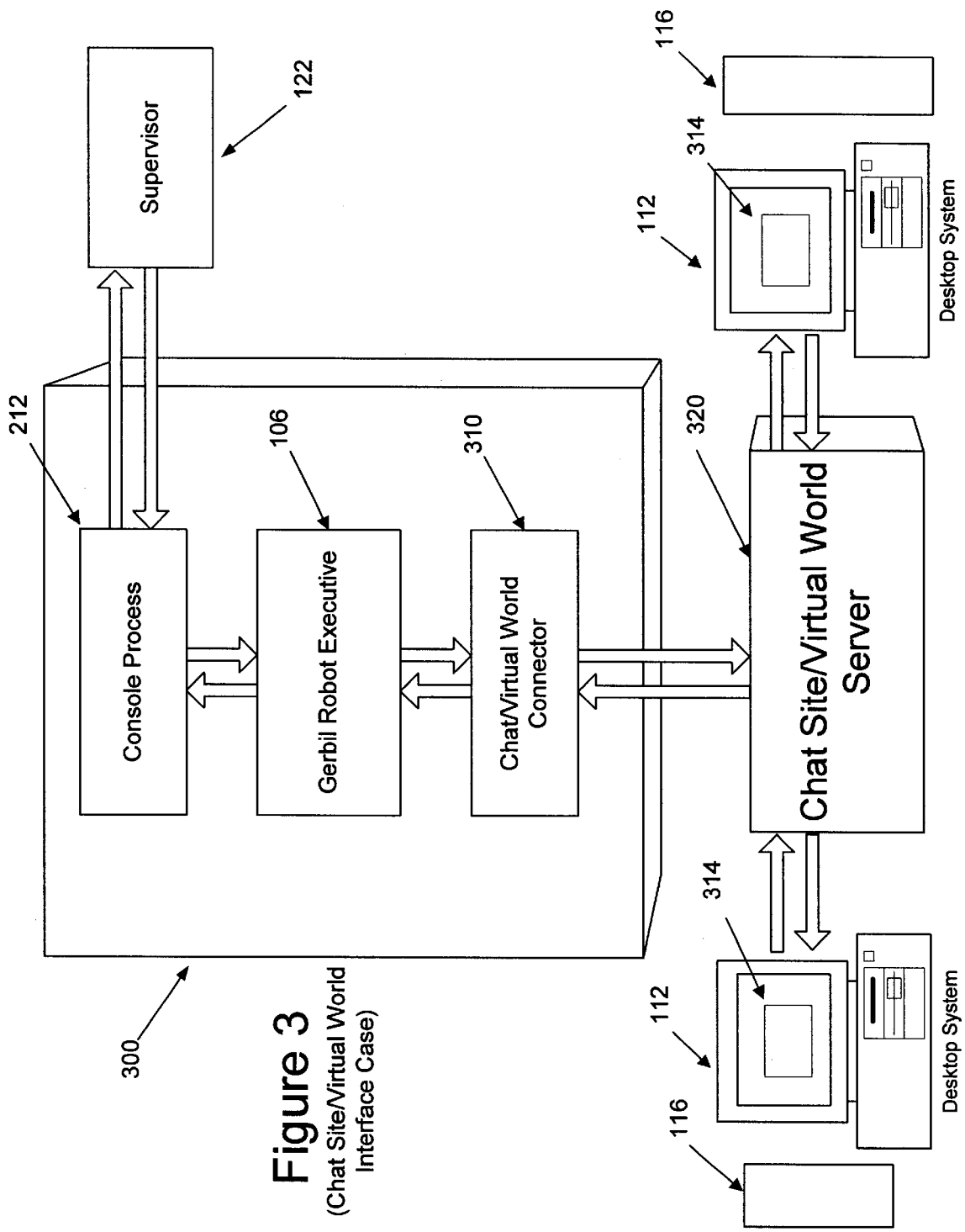
FIG. 3 depicts yet another operating environment wherein the BOT processor is merely a client of another server, such as a chat room or virtual world server.

FIGS. 2 and 3 depict slightly different operating environments for the purposes of the present invention. FIG. 2 depicts a situation wherein the BOT processor 200 connects to user 116 is via an intranet or internet connection e.g. web connector 210. For example, web connector 210 may thus spawn a Java applet 216 inside of an HTML page 214 to provide the two-way communications as discussed above. It will be appreciated that such use of Java applets embedded in HTML pages is well known to those skilled in the art. Alternatively, HTML page 214 might communicate directly with web connector 210 via a CGI connection or some other well-known connection protocol. Likewise, the BOT server can accept HTML requests directly. In such cases, persistent state information can be tracked by a "cookie" set in the web browser or other means.

As is shown, supervisor 122 interfaces with robot executive 106 via console process 212. Console process 212 monitors the execution of robot executive 106 and may do so with a reduced set of monitoring tasks, such as merely checking to see if robot executive 106 is actively running. FIG. 3 depicts a situation wherein the BOT processor 300 is merely a client of another server, such as a chat room or virtual world server, as depicted by server 320. BOT processor 300 is connected to server 320 via a chat/virtual world connector 310 in much the same fashion as any client would connect to a server site. Users 116 that desire to talk or converse with the BOT processor 300 interact through their client connections 314 in much the same fashion as any client-to-client communications that would be effected on server 320.

Although FIGS. 1, 2 and 3 give a general description of various operating environments in which virtal BOTs may exist, it will be appreciated that many other operating environments are obvious to those skilled in the art and that the scope of the present invention should not be so limited to the exemplary descriptions as given above.

II. BOT PROCESSOR DESCRIPTION
A. SCRIPT PROGRAMS AND LANGUAGE

As mentioned above, runtime executive 106 embodies the necessary information to maintain a reasonable conversation with human users to answer their inquiries and to carry on a general discourse with them on a set of topics. These topics are created by the back end in the form of script programs 108 that are compiled (or interpreted) and incorporated into runtime executive 106. In the preferred embodiment of the present invention, script programs may be written by human designers having little or no formal programming experience. It will be appreciated that script programs can also be written by automated learning programs or through partially automated script creation tools, and that the present invention should not be limited to human-written script programs.

An exemplar of such a script program is given below in Table 1.

TABLE 1

AN EXAMPLE SCRIPT PROGRAM

Topic "What is Neuromedia" is
Subjects "NEUROMEDIA";
    If (Heard "what*Neuromedia") or
      (Focused and heard "what*it", "what*that")
    Then
      Example "What is Neuromedia?";
      Say "Neuromedia is a small corporation that sells bot authoring software";
    Done
EndTopic
Topic "Where is Neuromedia" is
Subjects "NEUROMEDIA";
    If (Heard "where*Neuromedia") or
      (Focused and Heard "where")
    Then
      Example "Where is Neuromedia";
      Say "Neuromedia is located in San Francisco";
    Done
EndTopic
Topic "What is Gerbil" is
Subjects "GERBIL";
    If (Heard "what*Gerbil") or
      (Focused and Heard "what*it")
    Then
      Example "What is Gerbil";
      Say "Gerbil is a bot-scripting language";
    Done
EndTopic
Topic "Is Gerbil easy?" is
Subjects "GERBIL";
    If (Heard "is*Gerbil*easy") or TABLE 1-continued

AN EXAMPLE SCRIPT PROGRAM (Focused and (Heard "is*it*easy"))
    Then
      Example "Is Gerbil easy to use?";
      Say "Yes, Gerbil is very easy to use.";
    Done
EndTopic
Topic "Give me an example of Gerbil" is
Subjects "GERBIL";
    If (Heard "example" and "Gerbil") or
      (Focused and heard "example")
    Then
      Example "Give me an example of Gerbil";
      Say "Here's a sample of a Gerbil script:",
      "   Topic \"Hello World\" is",
      "    If Heard \"hello\" Then",
      "     Say \"Hi there!\"",
      "    Done",
      "  EndTopic";
    Done
EndTopic
Default Topic "I don't know" is
    Always
      Say "I don't know what you mean.";
    Done
EndTopic Considering the script program above, several aspects of the scripting language become apparent. First, as designed, the script language uses language primitives that are very close to human natural language. Thus, this scripting language is easy to use by users that have no facility in programming languages per se. TABLE 2 is a BNF (Backus Normal Form) description of the present embodiment of the scripting language:

TABLE 2

BNF DESCRIPTION OF THE SCRIPTING LANGUAGE WITH COMMENTS

```
<Program> = <Statement>*
<Statement> = <Definition>|<Category>
There are two types of statements in a program: constant definitions and input
processing categories. All run-time processing of a user input is handled in the
categories.
    <Definition> =   <PatternDef>|<PatternListDef>|<CategoryListDef>|
                     <AttributeDef>|<OtherExampleDef>|<SubjectInfoDef>
    <PatternDef> = Pattern <symbol> is <string>;
    <PatternListDef> = PatternList <symbol> is <string> [,<string>*];
    <CategoryListDef> = <CatListType> <symbol> is <string> [,<string>*];
    <CatListType> = TopicList|ScenarioList|CategoryList;
    <AttributeDef> =   Attribute <memref>;|Attribute <memref> specificity
                       <integer>;
    <OtherExampleDef> =  Other Examples of <string> are <patlist>;|
                         Other Examples of <string> WhenFocused are
                         <patlist>;
    <SubjectInfoDef> =   SubjectInfo <SubjectName> is
                         Replace <pronoun> with <replacement>
                         [,Replace <pronoun> with <replacement>|
                         ,<pronoun> with <replacement>]*;
    <SubjectName> = <string>
    <pronoun> = <string>
    <replacement> = <string>
```

Patterns are used to assign a name to a fixed string. The name can then be used in place of the string throughout the program, for readability and ease of modification. Similarly, a PatternList is used to assign a name to a list of strings, and a TopicList, ScenarioList, or CategoryList is used to assign a name to a list of category names (see below.) Attribute declarations are used to declare attributes so that information about them can be displayed through various debugging functions. Declaration of attributes is optional; attributes can be used without being declared. An attribute declaration can also assign a "specificity" value that is used when the attribute is tested using If recall or any matching condition. If an attribute is not declared, or is not given a specificity value in its declaration, it is given the default specificity value of 2000. OtherExamples declarations define additional arguments for a particular example statement. These additional arguments are tested whenever the original example is tested using the automatic verification mechanism. An OtherExample declaration can also include the keyword WhenFocused to indicate that the arguments are context-sensitive examples.

A SubjectInfo declaration is used to assign pronoun replacement pairs to subjects, ordinarily subjects that have been assigned to one or more topics in the BOT script; the SubjectInfo declaration has no effect for subjects that are not defined. The pronoun and replacement can be any string. However, the invention is most commonly used for replacing the values of common English pronouns such as "he". It is illegal for the same pronoun to be included more than once for a given subject, or to declare subject information for a subject more than once.

<Category>=<Topic>|<Scenario>
<Topic>=<CategoryInfo>Topic<string>is
 <Tstatement>*EndTopic
<Scenario>=<CategoryInfo>Scenario <string>is
 <statement>*EndScenario
<CategoryInfo>=[Suppressed]
 [Priority|Default|Sequence]

A category is either a topic or a scenario. A topic is used to process user statements, while a scenario is used to process user actions. The term "category" is used to generically refer to a topic or scenario.

Categories are divided into four types, priority, standard, default, and sequence, according to the label preceding the word "topic" or "scenario". A category that is not labeled is a Standard type. When the user makes a statement or takes an action, the categories in the program are executed, until a Done is reached (see below.) All priority categories are executed first, in the order in which they appear in the program. Next, all standard categories are executed. The order in which standard categories are executed changes dynamically depending on the execution of the program, and is described in the next paragraph. Finally, all default categories are executed, in the order in which they appear in the program. Sequence categories are executed only when explicitly accessed in a SwitchTo statement.

Standard categories are executed according to a "best-fit" matching mechanism, in which ties are broken according to an ordered list that initially corresponds to the order in which they appear in the program. When a standard category is executed, it, and other categories that share at least one Subject, is moved to the front of the standard category list (and so will be executed first on the next input.) The order of the standard category list can also be changed by commands within the program, as described below.

Categories can also be temporarily suppressed, in which case they are not executed at all. If the keyword Suppressed appears in front of the category definition, it is initially suppressed. Category suppression is discussed further below.

<Tstatement>=
 <MemoryLock>|<SubjectList>|<Tconditional>
<Sstatement>=
 <MemoryLock>|<SubjectList>|<Sconditional>
<Tconditional>=<Condition>
 (<Command>|<Tconditional>)
 *<TconditionalEnd>|<Tconditional>Otherwise
 <Tconditional>
<Sconditional>=<Condition>
 (<Command>|<Sconditional>)
 *<SconditionalEnd>|<Sconditional>Otherwise
 <Sconditional>
<TconditionalEnd>=
 Done|Continue|NextTopic|TryAgain|SwitchBack
<SconditionalEnd>=
 Done|Continue|NextScenario|TryAgain|SwitchBack The body of each category is a list of conditional blocks. These conditional blocks are executed in the order found in the category. If the condition of a conditional block is false, execution goes on to the next conditional block in the category, or to the next category if there are no further conditional blocks. If the condition is true, the commands and conditional blocks inside the block are executed, and further behavior of the program is dependent on the keyword which ends the conditional block. If it ends with Done, execution ceases until the next input occurs (unless an InterruptSequence has been executed; see below.) If it ends with Continue, execution continues with the next conditional block in the category, or the next category if there are no further conditional blocks. If it ends with NextTopic/NextScenario, the rest of the current category is skipped and execution continues with the next category. If it ends with TryAgain, the most recent WaitForResponse within the block is executed (it is an error to end a block with TryAgain if it does not contain a WaitForResponse.) If it ends with SwitchBack, execution resumes immediately following whichever SwitchTo statement switched to the current block. It is an error to end a block with SwitchBack if the block is not inside a Sequence topic.

Conditional blocks can be combined using the Otherwise keyword; if the first condition is true then the condition block(s) that follow the Otherwise keyword are not executed. This behavior is similar to the behavior of an "else" command in C and similar programming languages.

<MemoryLock>=MemoryLock<memref>[,<memref>]*;

The top level of a category may contain one or more MemoryLock statements. Each MemoryLock statement asserts that the value of one or more associative memory elements should only be changed within that category. If an associative memory key ?x is MemoryLocked in a category C, it is an error for a program to assign a value to ?x using Remember or Forget anywhere outside the category C, or to MemoryLock ?x in some other category.

<SubjectList>=Subjects<string>[,<string>]*;

The top level of a category may contain one or more Subjects statements. Each asserts that the given subjects are subjects of the topic. If a non-IF command within the body of the topic is executed, all topics which share at least one Subject with the topic are brought to the front of the focus of attention.

<Condition>=<SingleCondition>Then
|<SingleCondition>[and<SingleCondition>]*Then
|<SingleCondition>[or<SingleCondition>]*Then
|If<ConditionClause>[and <ConditionClause>]*Then
|If<ConditionClause>[or <ConditionClause>]*Then
|IfChance Then
|Always A condition can either be a basic condition (described below) or a Boolean combination of basic conditions. A Boolean combination of basic conditions that includes both and and or keywords must use parentheses to prevent possible ambiguity; there is no built-in operator precedence between and and or in GeRBiL. The Boolean not operator is implemented within the basic conditions; there is no explicit not keyword that applies to conditions. Finally, there are two basic conditions that cannot be combined using Boolean operators. The IfChance condition with no numeric argument is a probabilistic condition that has the same likelihood of being true as all the other argument-less IfChance statements immediately before or after it. Finally, the Always condition is simply always true.

<ConditionClause>=<MatchLHS><PosMatchKeyword>
        <MatchingList>
   |<MatchLHS><NegMatchKeyword><PosMatchingList>
   |Heard <MatchingList>
   |NotHeard<PosMatchingList>
   |Recall<MemList>
   |DontRecall<PosMemList>
   |Chance<chance>
   |Focused
   |(<ConditionClause>[and<ConditionClause>]*)
   |(<ConditionClause>[or <ConditionClause>]*)
   |{(<ConditionClause>[and<ConditionClause>]*}
   |{<ConditionClause>[or<ConditionClause>]*}
   |<MatchLHS>=<string>|<memref>|<starbufref>
   |<PosMatchKeyword>=
       Contains|Matches|ExactlyMatches
   |<NegMatchKeyword>=
       DoesNotContain|DoesNotMatch|DoesNotExactlyMatch There are four basic types of condition clause. First, conditions using the match keywords match a particular input pattern, most normally an element of the user memory, such as the string said by the user, to some set of template patterns, which may contain various "macro" characters, such as wildcard characters. Negated matching keywords, such as DoesNotContain, are given their own special category, in order to prevent "double negative" conditions. The Heard and NotHeard keywords are shortcuts equivalent to the commonly used condition "?WhatUserMeant Contains". Second, Recall and DontRecall are used to test whether elements of the user memory have been set or not, and are most commonly used in practice for testing flags that are set by libraries, for instance to indicate the type of question or statement that is being processed. Third, Chance conditions are true or false at random with the given probability. Fourth, Focused conditions are true if the category in which it is found contains one or more subjects in common with a category that was activated by the most recent input that activated at least one subject. Condition clauses can also be combined using and and or as long as parentheses are used to prevent ambiguity. The curly bracket symbols {} can be used to indicate that a condition is optional.

<SingleCondition>=IfHeard<MatchingLis>|
      IfNotHeard<PosMatchingList>|
      If recall<MemList>|
      IfDontRecall<PosMemList>|
      IfChance<chance>

The single condition objects are equivalent in meaning to the analogous condition objects, except that the If keyword is combined with the condition keyword. In the present implementation, there are also certain cases where single condition objects can be substituted for condition clause objects.

<MatchingList>=<MatchingListArg>[[and|&]
      <MatchingListArg>]*
   |<MatchingListArg>[[and|&]<MatchingListArg>]*
      [[and|&]not<MatchingListArg>]*
   |<MatchingListArg>[[or|,]<MatchingListArg>]*
   <MatchingListArg>=<patlistobj>|(<MatchingList>)
   <PosMatchingList>=<PosMatchingListArg>[[and|&]
      <PosMatchingListArg>]*
   |<PosMatchingListArg>[[and|&]
     PosMatchingListArg>]*[[and|&]not
     <PosMatchingListArg>]*
   |<PosMatchingListArg>[[or|,]
     <PosMatchingListArg>]*
   <PosMatchingListArg>=<patlistobj>|
     (<PosMatchingList>)

A matching list is a list of pattern list objects (single expressions evaluating to lists of strings; see below) separated by and, and not, or or. (The keyword and and the ampersand character (&) are interchangeable, as are the keyword or and the comma.) A matching list serves as the right-hand-side of a matching expression. Parentheses must be used to prevent ambiguity any time a memory reference list contains both and and or. Finally, a positive-only matching list does not allow the use of and not, in order to prevent double negatives such as "DoesNotContain X and not Y".

<MemList>=<MemListArg>[[and|&]<MemListArg>]*
     |<MemListArg>[[and|&]<MemListArg>]* [[and|&]not
      MemListArg>]*
     |<MemListArg>[[or|,]<MemListArg>]*
   <MemListArg>=<memref>|(<MemList>)
   <PosMemList>=<PosMemListArg>[[and|&]
     <PosMemListArg>]*
     |<PosMemListArg>[[or|,]
     <PosMemListArg>]*
   <PosMemListArg>=<memref>|(<PosMemList>)

A memory reference list is a list of one or more memory references separated by and, and not, or or. (The keyword and and the ampersand character (&) are interchangeable, as are the keyword or and the comma.) Parentheses must be used to prevent ambiguity any time a memory reference list contains both and and or. Finally, a positive-only memory reference list does not allow the use of and not, in order to prevent double negatives such as "DoesNotContain ?X and not ?Y"

<Command>=Say <patlist>;|SayOneOf<patlist>;|
      Do<patlist>;|DoOneOf<patlist>;|
      SayToConsole<patlist>;|SayToFile<string><patlist>;|
      Trace<patlist>;
      Focus<catlist>;|Focus Subjects<string>[,<string>]*;|
      DontFocus;|Suppress<catlist>;|Recover<catlist>;|
      Forget<memlist>;|ForgetOneOf<memlist>;|
      Remember<memlist>;|RememberOneOf>memlist>;|
      Remember<memref>is<patlist>;|
      Remember<memref>IsOneOf>patlist>;|
      Remember<memref>is Compute<FunctionName>of
        <patlist;|
      WaitForResponse;|InterruptSequence;|
      SwitchTo<string>;|SwitchTo<symbol>;|
      SwitchToOneOf<catlist>;|
      Example<patlist>;|InitialExample <integer><patlist>;|
      SequenceExample<exampleindex><patlist>;
    <FunctionName>=
      SpellCheck|URLEncoding|ReplacePronouns|
      Capitalize|UpperCase|LowerCase There are currently 27 basic commands. Say makes a statement to the user, while Do takes an action of some sort. (The possible arguments of a Do action are domain-specific.) SayOneOf and DoOneOf nondeterministically select one of their arguments, and Say or Do that argument. SayToConsole is a Say statement whose output is directed to the console window and log file. SayToFile is a Say statement whose output is directed to a file specified in the command. Trace is a Say statement whose output is directed to the console window and log file, and only appears when the script is being run in various debugging modes. Remember is used to assign values to associative memory elements; if a list of arguments is given with no is keyword, each argument is assigned an arbitrary non-empty value (currently the string "TRUE".) Remember can also be used to compute a function and assign its value to a memory element; currently implemented functions include spell-checking, URL encoding, pronoun replacement (according to pronoun-replacement pairs defined in SubjectInfo), and several string capitalization operations. Forget is used to un-assign values of associative memory elements. Once Forget ?x has been executed for some element ?x, ?x will have no value and will not cause an IfRecall statement to become true, until a Remember statement is executed for ?x. ForgetOneOf, RememberOneOf, and Remember. IsOneOf are the nondeterministic equivalents of Forget, Remember, and Remember. Is, respectively. Suppress takes a list of categories as arguments and suppresses each of its argument categories so that they are no longer executed on any input. Recover takes a list of categories as arguments and reverses the effect of a Suppress command. Focus takes a list of categories as arguments and places them at the front of the ordered category list. Focus Subjects takes a list of subjects as arguments and places all categories which cover at least one of those subjects (as defined with a Subjects command in the top level of the category) at the front of the ordered category list. WaitForResponse halts execution in the same way as a Done statement but resumes at the same point on the next input. InterruptSequence can only be used within a Sequence topic, and temporarily halts execution of the current topic while all of the standard and default topics are executed. When a Done is reached, or when all of the standard and default topics are completed, execution resumes, without waiting for further input, within the Sequence topic. A SwitchTo command immediately transfers control of execution to the named category. A SwitchToOneOf command chooses one of its arguments at random and executes a SwitchTo on it. Example statements do not have any immediate effect, but are used in automatic verification.

<pat>=
  <string>|<symbol>|<memref>|<starbufref>|<pat>+
  <pat>

A pattern is anything that evaluates to a string. It can be an explicit string (indicated with quotes), the name of a Pattern object, an associative memory reference, a reference to a "star buffer element" (set according to wildcard characters appearing in template patterns within pattern matching conditional statements), or a concatenation of any of the above.

<patlistobj>=<pat>|<symbol>|(<patlist>)
  |{<patlist>}|<patlistobj>+<patlistobj>

A patternlist object is any single expression that evaluates to a list of zero or more strings. It can be a single pattern, the name of a PatternList object, a PatternList enclosed in parentheses (also known as an "implicitly defined PatternList" since it is never explicitly given a name), a PatternList enclosed in curly brackets (indicating that the element or elements included within the brackets are "optional"), or a concatenation of any of the above. The value of the concatenation of two lists of strings is a list consisting of the concatenation of each element in the first list with each element of the second list. A symbol is a string of alphanumeric or underscore characters, beginning with a letter. Symbols are not case sensitive.

<patlist>=<patlistobj>[, <patlistobj>]*

A pattern list is anything that evaluates to a list of strings. It consists of one or more PatternList objects, separated by strings. Since each PatternList object may have a value that is a list of strings, the value of the PatternList is the value of all the elements appended together.

<catlist>=<catname>[,>catname>]*
<catname>=<string>|This|<symbol>

A category reference is either an explicit string containing the name of a category, the keyword This (referring to the category in which it appears) or the name of a CategoryList (or TopicList or ScenarioList) object. A category list is simply a list of categories or CategoryList objects separated by commas.

<memref>=?<symbol>|?<pat>:<symbol>
<memlist>=<memref [,<memref>]*

A reference to the associative memory is normally indicated by a ? followed by the name of the key. Such references are normally particular to the user whose input is being processed. A reference to the associative memory for another user can be made by putting a pattern referring to the other user between the ? and the key. The reference to the other user is separated from the key by a colon. A memory reference list is simply a list of memory references separated by commas.

<starbufref>=
  #<integer>|*<integer>|%<integer>|&<integer>|*match The "star buffer" contains the substring of an input string which matched each *, #, %, or & wildcard character in the template pattern in the most recent successful match. References to this star buffer consist of a symbol (*, #, &, or %) followed by a number. *n refers to the substring which matched the Nth*wildcard character found in the template, and so on. *match refers to the substring of the input string that matched the entire template pattern.

<chance>=<realnumber>|<realnumber>%

The argument of a Chance statement is either a real number between 0 and 1, interpreted as a probability, or a real number between 0 and 100 followed by a % sign, interpreted as a probability multiplied by 100.

<exampleindex>=<integer>[.<symbol>]*

The index for a SequenceExample statement is an integer followed by zero or more strings of alphanumeric characters, separated by periods.

The second aspect of the example script program is that the scripts themselves embody a particular universe of discourse reflective of the subject matter concerning the site itself—e.g. a BOT for a site of a reseller of personal computer should "know" something about computers and their peripherals. These script programs are written in an action-response type style wherein the actual language supplied by the user embodies an "action" to which the "response" is written into the script program itself.

Scripts in the present embodiment are written generally by site administrators (human or otherwise) by defining a list of "categories" in which the site will be well conversant. Categories may comprise "topics" that are recognizable by the runtime executive. Topics, in turn, may comprise patterns or words that are matched against the stream of input communication (in either spoken or written or any other suitable form of communication) from the user.

To embody this knowledge into the runtime executive itself, the script programs are compiled by compiler 107 in FIG. 1. As previously mentioned, these script programs may be iteratively tweaked to improve the interaction with human users by a re-edit and re-compile process. It will be appreciated that compiler techniques sufficient to implement the above-listed BNF language description are well known to those skilled in the art and that the present invention should not be limited to any particular compiler techniques.

B. RUNTIME EXECUTIVE PROCESS

Figure 4:
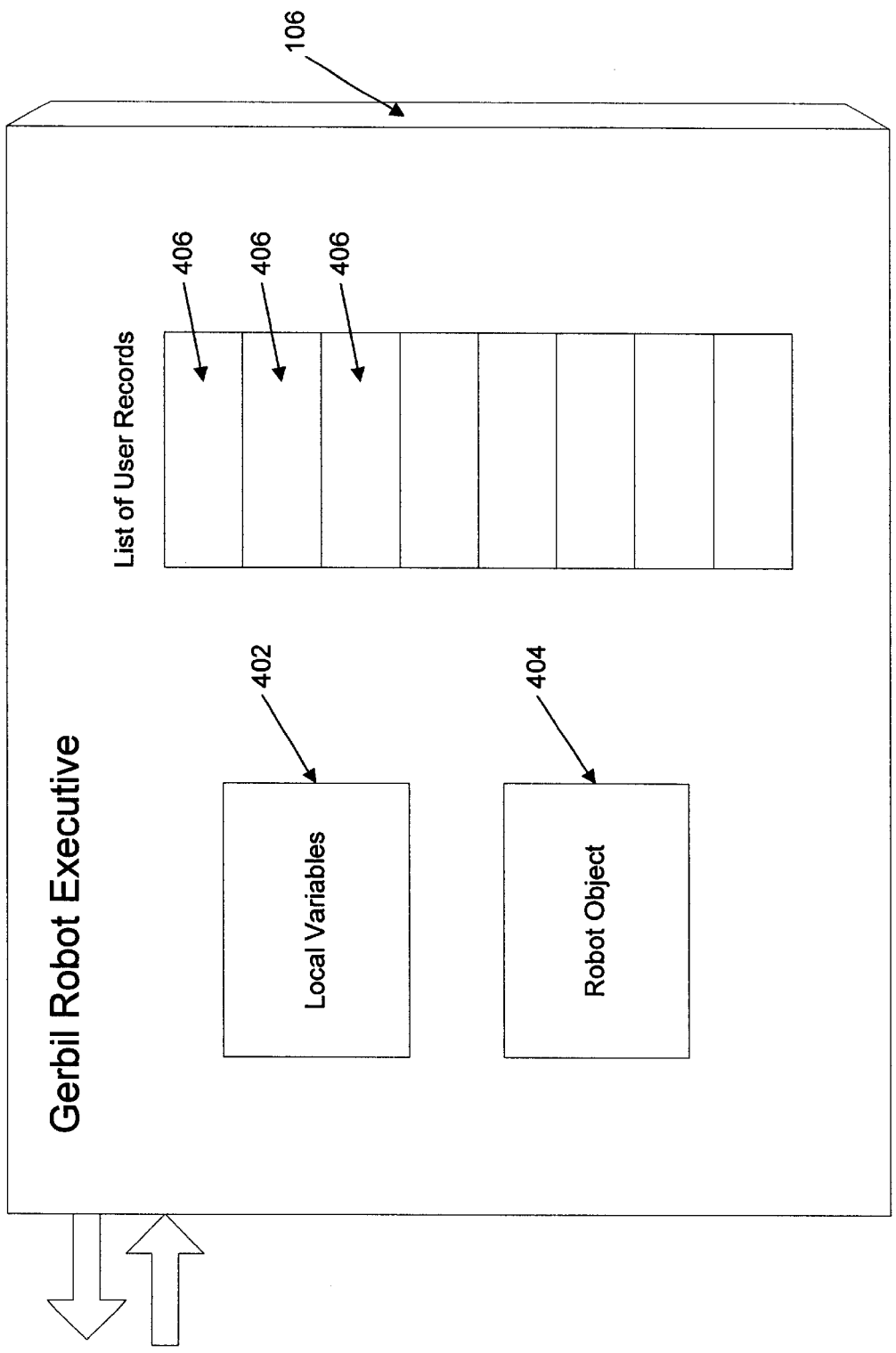
FIG. 4 expands the view of one embodiment of the runtime executive suitable for the purposes of the present invention.

FIG. 4 expands the view of runtime executive 106 of FIG. 1. Runtime executive 106 comprises local variables 402, robot object 404, and a list of user records 406. Robot object 404 is that part of runtime executive 106 that is incorporated by the compilation process described above. Although robot object 404 may be changed via the re-edit and re-compilation process as mentioned, during runtime, robot object 404 typically does not change whilst in conversation with user 116. The list of user records 406 is provided because the BOT processor could be in conversation with multiple users simultaneously and therefore needs to maintain the state of each on-going conversation. The state for each such conversation is maintained in a user record 406. Similar user records can also be used to store the state of the robot and as test users for automated testing routines. Finally, runtime executive 106 maintains local variables 402 that are used during the processing of a single user input. Runtime executive 106 also contains a variety of other information used in processing BOT input, such as information about different execution modes in which the BOT can be run, and a pointer to the output window in which a transcript of the BOT's conversation should be displayed.

Figure 5:
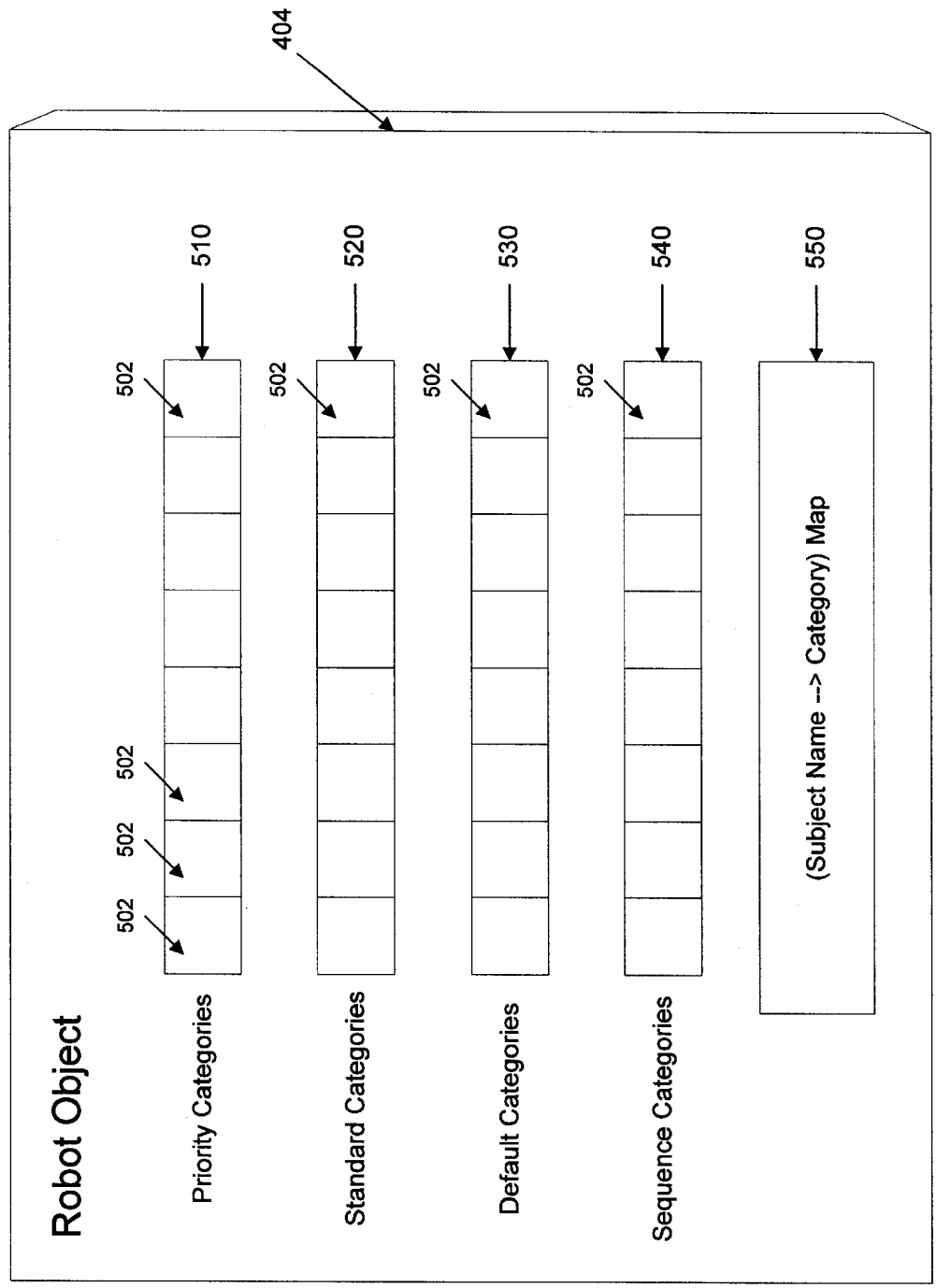
FIG. 5 expands the view of an embodiment of the robot object suitable for the purposes of the present invention.

FIG. 5 expands the view of robot object 404 as shown in FIG. 4. Robot object 404 comprises several types of categories. These categories inherently maintain a priority by which runtime executive 106 processes inputs. For example, in FIG. 5, four types of categories are depicted: priority categories 510, standard categories 520, default categories 530, and sequence categories 540. When an input comes into the BOT processor, the input is processed through a series of categories. First, the priority categories are processed to determine whether there is a response that will be generated by the current input. These priority categories are processed, in the present embodiment, in the order in which they appear in the runtime executive. This order is currently selected in turn by the actual order in which PRIORITY TOPICS are found in the script program. This processing continues through the standard and default categories. Standard categories are executed according to the mechanism disclosed in the above-incorporated-by-reference patent applications by Tackett et al. Default categories are executed in the actual order in which DEFAULT TOPICS are found in the script program. Sequence categories 540 are also included in the robot object 404 but are not executed unless explicitly executed by a SWITCH-TO statement as described below. In the present embodiment, sequence categories are typically employed to perform a number of pre-defined sequential communications with a user to effect a desired result. For example, having the BOT take an order for tickets to an event, how many such tickets, credit card information to purchase such tickets, etc. is readily implemented as a sequence category. Such a sequence category would be SWITCHed-TO if prompted by a user inquiry to buy tickets. It will be appreciated that other hierarchies of categories may be defined and order of execution selected. It suffices for the purposes of the present invention that some hierarchy of categories is defined and that the best fit mechanism as disclosed in the above-incorporated-by-reference application be employed using one or more of such categories.

FIG. 5 also contains subject-name to category map 550, which describes the categories associated with each subject found in a SUBJECTS command in one or more categories. This map helps to implement the Focus Subjects command and automatic focus mechanism, as described below.

Figure 6:
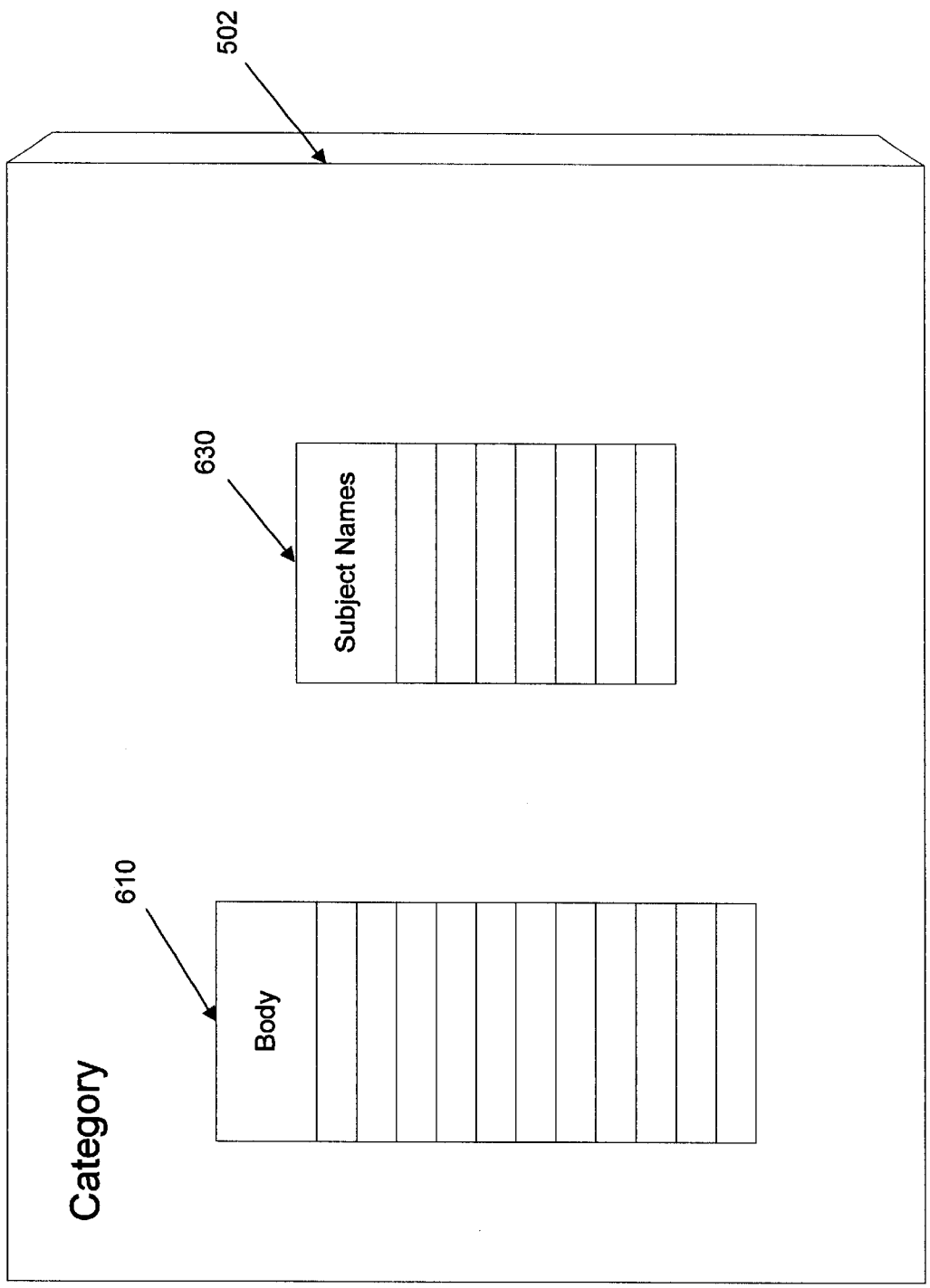
FIG. 6 describes the content of a category as embodied in a robot object.

FIG. 6 describes the content of a category 502. Category 502 comprises body 610 and subject names 630. Body 610 is a list of pointers to condition-action blocks. Such a condition-action block is a representation of an IF-THEN block found a script program. Subject names 630 are a representation of a listing of SUBJECTS that may optionally be found in a script program. As will be discussed in greater detail below, subject names 630 are used to focus the attention of the BOT processor on other categories similar to the category being processed.

Figure 7:
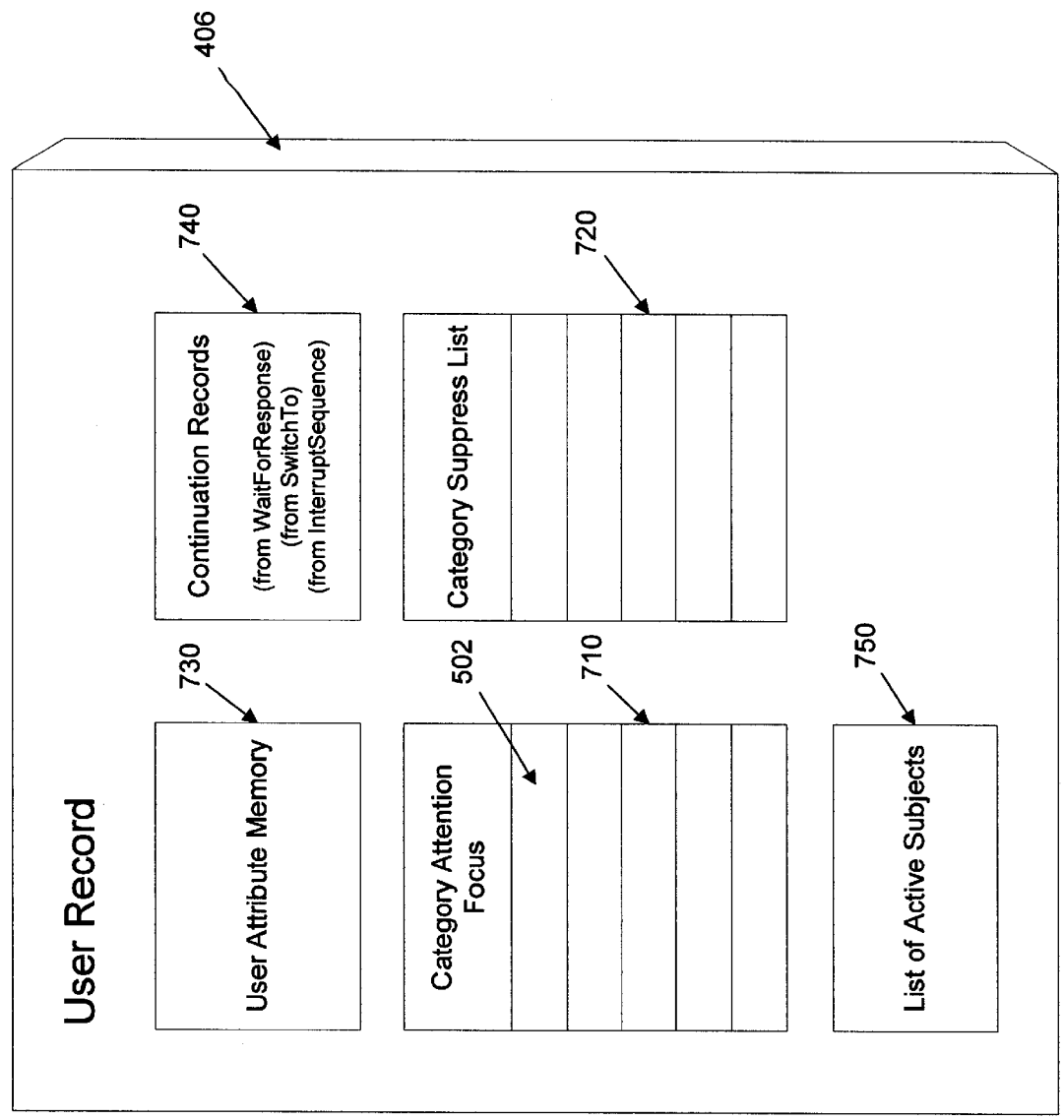
FIG. 7 expands the view of user record as shown in FIG. 4.

FIG. 7 expands the view of user record 406 as shown in FIG. 4. User record 406 comprises category attention focus list 710, category suppress list 720, user attribute memory 730, continuation records 740, and active subject list 750. In the current embodiment of the present invention, attention focus list 710 is an ordered list comprising the standard categories 520 found in robot object 404. More generally speaking, however, an attention focus list could be implemented as a much broader list of any number of categories, as opposed to any single type of category. Indeed, for the purposes of the present invention, an attention focus list is an ordering of categories that, by virtue of their ordering, may affect the execution of an automatic interface program (i.e. BOT). It will be appreciated that all the "lists" and other structures mentioned herein could be implemented in a wide variety of well known data structuring techniques. For example, in the present embodiment, lists are implemented as CTypedPtrLists, however, lists can be readily implemented in hash tables, arrays, linked lists, or other known methods. Thus, the scope of the present invention should not be limited to specific data structure and algorithm techniques and should include all well known design and implementation variants.

The ordering of categories within the attention focus list 710 may be different for different users and reflects the state of the BOT processor's conversation with the particular user. The categories at the top of the list 710 represent areas of discourse in which the BOT processor is currently focused. In the present embodiment, when a new user begins communications with the BOT processor, the attention focus list 710 for that new user corresponds exactly to the standard categories list 520—which in turn corresponds to the order in which TOPICS are found in the script program. As conversation between the user and the BOT processor continues, this ordering of categories in attention focus list 710 is reordered according to the topics discussed by the user.

Category suppress list 720 is a list of categories that have been suppressed explicitly in the script program. Suppression of categories can occur a number of ways: suppressed categories may be initially listed as suppressed in the script program or categories may be subsequently suppressed by execution of a particular action in a script program. If the user touches upon a suppressed topic, then the suppressed category is not executed by the BOT processor. This suppress feature allows the BOT creator to have greater control over the BOT's "personality" as presented to the user.

User attribute memory 730 allows the BOT processor to remember certain attributes of the user that it has learned during the course of the conversation. For example, the gender, the telephone number, the credit card number, the address of the user may be particular fields found in user attribute memory 730.

Continuation records 740 are used primarily when the BOT processor has interrupted the execution of a category and may eventually wish to resume execution of said category. Such interruptions can occur as a result of a WaitForResponse statement (in which case the BOT processor has made a query of the user and is awaiting a response), an InterruptSequence statement (in which case the BOT processor has temporarily halted processing of the current category), or a SwitchTo statement (in which case the BOT processor may eventually return to the category containing the SwitchTo statement after executing a Switch-Back command.) At such a point, continuation record 740 maintains the location of the execution of the script in memory. Once the interruption is complete, execution continues at such location. It will be appreciated that there are other times in which it is desired to store such execution state.

List of active subjects 750 is a list of strings containing the names of all the subjects that are currently the "focus of conversation". This set of subjects is the set of all subjects activated during the most recent bot response that activated one or more subjects, either through executing a category associated with one or more subjects (using the SUBJECTS keyword), or executing a FOCUS or FOCUS SUBJECTS command. Further details on the use of the active subjects list for resolving the context of an input are disclosed below.

Figure 8:
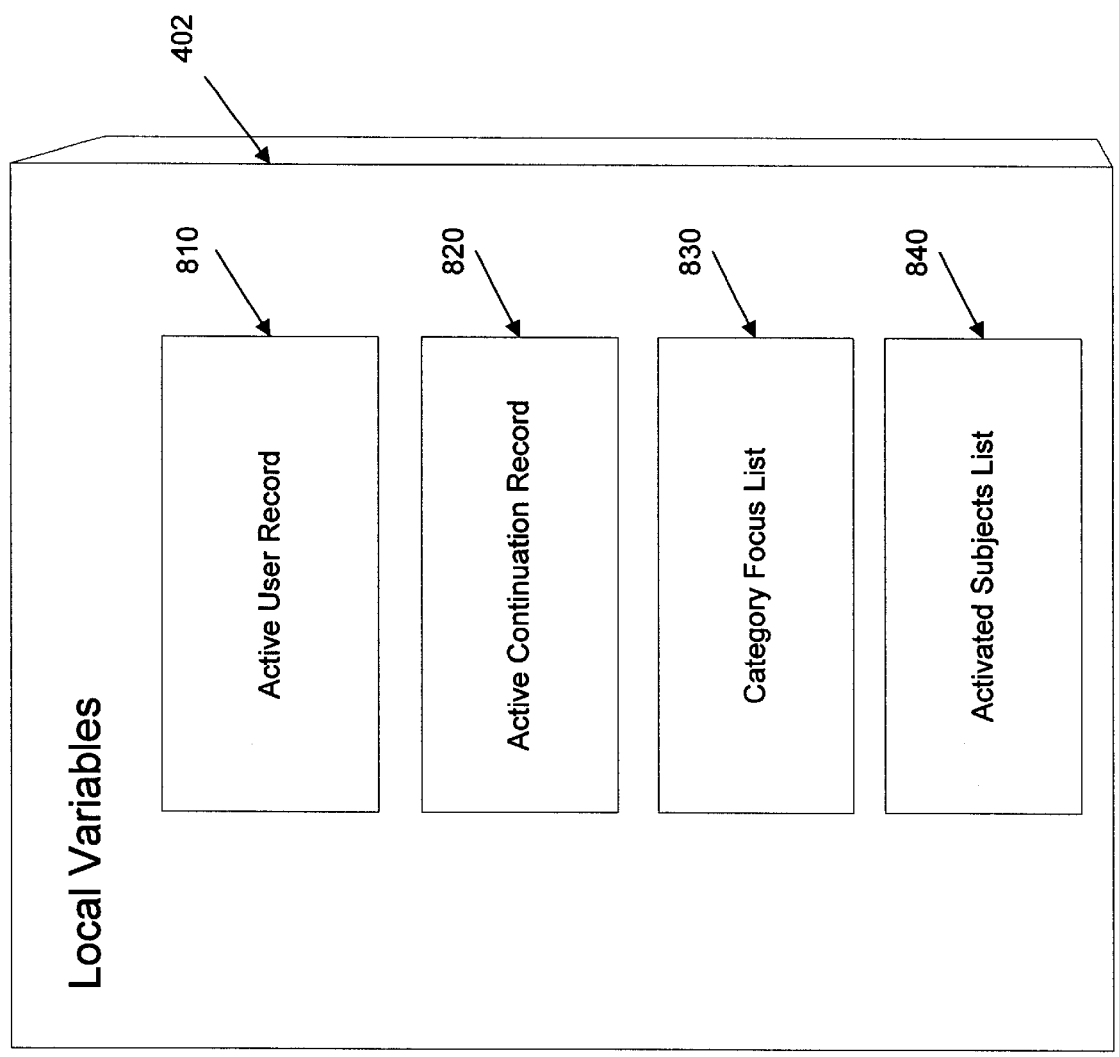
FIG. 8 expands the view of local variables as found in FIG. 4.

FIG. 8 expands the view of local variables 402 as found in FIG. 4. Local variables 402 comprise active user record 810, active continuation record 820, category focus list 830, and activated subjects list 840. Active user record 810 is the user record 406 that corresponds to the user that is currently talking to the BOT processor. Active continuation record 820 is one of the continuation records 740, if any, that is copied over for the current execution. Category focus list 830 provides an intermediate store of recently activated categories and other categories associated with them. Categories are associated if they share at least one subject name as listed in 630 in FIG. 6. Activated subjects list 840 provides an intermediate store of subjects associated with recently activated categories, or categories focused using a FOCUS or FOCUS SUBJECTS command.

III. EXECUTION OF GERBIL PROGRAMS
A. THE INTERNAL STRUCTURE OF A GERBIL PROGRAM

Now a more detailed explanation of both the structure and the execution of Gerbil programs in the present embodiment will be given. The session document (CGRBLToolDoc) contains all information about a BOT as it is being executed, including two member variables particularly relevant to the current disclosure:

| CUserRecordSet* | m__pursUsers; |
| CProgram* | m__ppProgram; |

The m__pursUsers structure contains information about each user that is presently conversing with the BOT (stored as a map from UserIDs to CUserRec structures), such as any facts remembered about that user and the focus of attention for that conversation. The m__ppProgram structure contains all the information about the BOT script itself, including the robot object created by the compilation process described above and various run-time variables needed during script execution. The session document also includes a number of other members such as pointers to various display windows and dialogs used during execution, lists of file names used in the BOT script, and so on.

There are two relevant member variables of the present embodiment of a Gerbil program (CProgram):

| CExeStruct* | ExeProg; |
| CRunStruct* | RunTime; |

The ExeProg contains an executable version of the Gerbil script. The RunTime structure contains variables that are used when executing the Gerbil script.

The CExeStruct contains the following relevant member variables:

| CCategoryList | PriorityCategories; |
| CCategoryList | DefaultCategories; |
| CCategoryList | SequenceCategories; |
| CCategoryList | StandardCategories; |
| CMapStringToPtr | m__pmspSubjectMap; |

Each CCategoryList contains a list of CCategory objects. Each CCategory contains a set of CConditionActionBlock objects, each with a condition and a list of CAction objects. A CConditionActionBlock is a type of CAction, so CConditionActionBlock objects can recursively contain other CConditionActionBlock objects. A CCategory also contains a list of all the subjects discussed by the category.

The lists PriorityCategories, DefaultCategories, and SequenceCategories are fixed in ordering and are shared among all users. Each user record contains a copy of the list StandardCategories (see below) in which the ordering of categories can dynamically change (according to the focus mechanism). The copy of StandardCategories in the CExeStruct is fixed in order and is used to create the initial copy of StandardCategories for each new user. Finally, the CExeStruct contains a map m__pmspSubjectMap from each subject name to the list of categories that discuss that subject.

In the present embodiment, the CRunStruct contains three relevant member variables:

CUserRec*User;
CTypedPtrList<CObList, CCategory*> FocusList;
CStringArray m__saActiveSubjects;

It also contains a number of temporary pointer variables, including Continuation, ActiveCatPos, and SwitchToCategory, which are used in execution as described below. User is a pointer to the user record for the user involved in the current conversation. FocusList is used to store the list of categories that have been activated by the focus of attention mechanism during the current execution of the Gerbil script. It will be used at the end of the run to modify the focus of attention for the current user, as described below. m__saActiveSubjects is used to store the list of subjects that have been activated by the focus of attention mechanism during the current execution of the Gerbil script. It will be used at the end of the run to modify the active subjects map for the current user, as described below.

The CUserRec contains information about the current user and the robot's conversation with the user. In particular, it contains a CMapStringToPtr containing the contents of the memory for the user, in which each attribute name is mapped to a list of strings representing the value of that attribute, and seven member variables relevant to the present mechanisms:

| | |
|---|---|
| CCategoryList | AttentionFocus; |
| CTypedPtrList<CObList, CCategory*> | SuppressList; |
| CContinuation* | Continuation; |
| CTypedPtrList<CObList, CContinuation*> | SwitchContinuations; |
| CTypedPtrList<CObList, CContinuation*> | SequenceContinuations; |
| CMapStringToString | m__mssReplacements; |
| CMapStringToPtr | m__mspActiveSubjects; |

AttentionFocus is a copy of the StandardCategories list from the program executable that describes the attention focus for the BOT's conversation with the current user. The order of the categories in this list may be different than the order in StandardCategories, due to the functioning of the focus mechanism. SuppressList is a list of pointers to the categories that are suppressed in the robot's conversation with the current user. SuppressList may include categories from the PriorityCategories, DefaultCategories, and StandardCategories list. m__mssReplacements is a mapping from certain words to other words, used in implementation of the pronoun replacement mechanism. m__mspActiveSubjects is a mapping from subject names to null pointers, indicating the set of active subjects associated with the current conversation. This mapping is used in implementing the Focused command disclosed below. Next, Continuation is NULL unless there is a WaitForResponse command that is currently active. In this case, Continuation points to a CContinuation structure that describes where in the script the WaitForResponse is located and how to resume execution from that point. Finally, the user record contains stacks of continuations that handle interruptions of a Sequence category and switches back from Sequence categones. SwitchContinuations contains a CContinuation for each SwitchTo statement for which a SwitchBack is still possible (much like the call stack in other programming languages), while SequenceContinuations contains a CContinuation for each sequence that has been interrupted by an InterruptSequence command and not yet returned. The functioning of these CContinuation stacks is described further below.

B. THE EXECUTION OF A GERBIL PROGRAM

One main feature of a Gerbil program is its ability to "focus" categories for the express purpose of being more responsive to user communication. The "focusing" of categories, for the purposes of the present invention, is implemented by a combination of explicit and automatic methods. Explicit focusing can be accomplished in one of two ways in the current embodiment. The first focus mechanism, the "Focus" command, is added to the script program to explicitly focus a particular category when the command is executed. As will be explained below, "focusing" in the current embodiment moves the focused category to the front of the attention focus list. Thus, during the course of execution, the runtime executive will generally check the newly focused category earlier than it would have had the category not been focused. As an example, a sample Focus command might look like—Focus "dogs", "cats";— this command would move the category "dogs" to the front of the attention focus list and the category "cats" immediately following it. The Focus command is usefull to make certain categories more immediate in the course of conversation and, in particular as to the above example, if the user had recently spoken of "pets".

The second explicit focus mechanism, the "Focus Subjects" command, is similar to the "Focus" command but differs in that it will move a set of unspecified categories, each said category sharing a Subject whereby the Subject is explicitly listed within a "Subjects" command within the category. For example, in a script that discussed the subject of pets, the command Focus Subjects "dogs" could be placed in any category and if said command is executed, then all categories explicitly listing "dogs" as a SUBJECT will be placed to the front of the attention focus list. This command is useful to focus related categories without having to explicitly list them all.

In addition to these explicit focus mechanisms, there is an automatic focus mechanism that works without use of explicit commands. If a category is activated by executing an output statement (such as Say or Do) within the category, then that category is moved to the front of the attention focus list. Additionally, in the current embodiment, if that category contains a Subjects command, then all other categories which share at least one of the arguments of the Subject command are also moved to the front of the attention focus list. It will be appreciated that other protocols could be observed upon automatic focusing of a category.

The focusing of categories is also used to determine a set of "active subjects" associated with the current state of the conversation. Any time an input is processed that leads to one or more categories being "focused", either through explicit or automatic focus methods, and at least one of these categories is associated with one or more subjects, the set of active subjects is cleared and replaced with the set of all subjects associated with any of the categories that were activated (including any subjects explicitly mentioned in a "focus subjects" command.) Further details on the use of the set of active subjects are disclosed below.

Another, somewhat related mechanism, "Suppress", is implemented in the current embodiment. "Suppress" is an explicit command that disables the activation of the categories named in the command for the remainder of the course of conversation with that user. Such categories can be placed back into consideration with the use of the "Recover" command. For example, the command—Suppress "dogs";—will suppress the category "dogs" from further discussion, even if an explicit Focus command would purport to move it to the front of the attention focus list.

Now a more detailed description of the current embodiment will be discussed. During execution, each Gerbil command in the present embodiment actually returns a CABlockEnd value that describes what the program should do following the command. This value is normally Continue, indicating that the program should continue by executing the next Gerbil command. It can also be one of the values Waiting, Done, NextCategory, Switch, SwitchBack, NotActivated, or RunTimeError. (The Done, Continue, and NextTopic "terminators" that appear at the end of a condition block in a Gerbil code are actually implemented as commands that do nothing other than return the appropriate CABlockEnd value.) In this context, the following is a discussion concerning six Gerbil commands that are relevant to the focus of attention mechanism: Focus, Focus Subjects, WaitForResponse, TryAgain, InterruptSequence, and SwitchTo.

Each Focus command in a Gerbil script has as arguments a list of categories. This list is converted by the compiler into a list of pointers to the actual categories. When the Focus command is executed, these pointers are copied to the end of the RunTime->FocusList structure (to later be brought to the front of the attention focus list.) In addition, all subjects associated with each category are added to the list of active subjects. The C++ code for CFocus::Execute is straightforward and is shown below.

```
POSITION pos = ArgValues.GetHeadPosition( );
for(;pos != NULL;) {
    ArgCategory = (ArgValues.GetAt(pos))->Category;
    ArgValues.GetNext(pos);
    if (ArgCategory != NULL) {
        TRACE("Putting Category \"%s\" on focus list\n",
            ArgCategory->Name);
        Context->m_ppProgram->RunTime->FocusList.AddTail(
                                            ArgCategory);
    }
    for (int k=0; i<ArgCategory->m_saSubjectNames.GetSize( ); k++)
    {
        Context->m_ppProgram->RunTime->
            m_slActivatedSubjects.AddTail(
            ArgCategory->m_saSubjectNames[k]);
    }
}
return Continue;
```

In order to execute a "Focus Subjects" command, the robot executive takes each argument and uses the map m_pmspSubjectMap found in the CExeStruct to determine which categories share that subject. Each of the categories contained in the m_pmspSubjectMap under the subject name is appended to the end of RunTime->FocusList. The name of the subject is also added to the RunTime->m_slActivatedSubjects list.

The WaitForResponse command causes execution on the current input to stop, but before that, sets up a CContinuation telling the Gerbil program where to restart when the next input is processed. This CContinuation is created by the compiler and stored in the CWaitForResponse statement. The code for CWaitForResponse::Execute is trivial; it simply copies the CContinuation pointer into RunTime->User->Continuation and returns Waiting.

A TryAgain command is simply a special case of WaitForResponse in which the CContinuation starts from the previous WaitForResponse rather than the TryAgain command. A TryAgain command is converted into an appropriate CWaitForResponse by the compiler.

An InterruptSequence command can only be used within a Sequence category, and causes the execution of the category to be suspended while all of the standard and default categories are executed. (InterruptSequence can only be used after a WaitForResponse, to prevent possible conflicts in which a category might be executed twice.) It is implemented by adding a CContinuation to the top of the SequenceContinuations stack (allowing nested interruptions within interruptions) and returning the value NextCategory.

Each SwitchTo command in a Gerbil script has the name of a single category as an argument Again, this category name is converted into a pointer by the compiler. When the SwitchTo command is executed at run-time, this pointer is copied into a member variable RunTime->SwitchToCategory and the value Switch is returned. Furthermore, a CContinuation representing the SwitchTo is copied into User->SwitchContinuations so that the category can be resumed if the target category ends with a SwitchBack. The fact that User->SwitchContinuations is a stack allows arbitrarily deep series of SwitchTo and SwitchBack calls.

In order to prevent cycles in which a category in the attention list is repeatedly executed and then SwitchedTo from another category later in the attention list, the present embodiment of the program checks to make sure that the category has not already been executed before returning any value. If it has already been executed, the value RunTimeError is returned instead. Such cycles can only occur with standard categories. The compiler will check all sequence categories and guarantee that cycles among them will not occur. This is done by viewing each category as a node in a graph and each SwitchTo as an arc, and doing depth-first search to detect cycles in the graph. A WaitForResponse before the SwitchTo eliminates the arc caused by that SwitchTo, as it will prevent cycles from occurring while processing a single input. The C++ code for CSwitchTo::Execute is shown below. The SwitchToOneOf command is a straightforward extension of SwitchTo.

```
CCategory*DestCategory=Destinations[selection]-
    >Category;
ASSERT(DestCategory!=NULL);
if ((DestCategory->Executed) && (DestCategory-
    >Priority!=SequencePriority)) {
    //run-time error to switch to an already-executed non-
        sequence category
    Context->m_ppProgram->PrintTraceMsg("ERROR",
        SrcFileName, SrcLine);
    return RunTimeError;
}
//record what category is being switched to in the run-time
    data structure
Context->m_ppProgram->RunTime-
    >SwitchToCategory=DestCategory;
//and remember where it was called from
Context->m_ppProgram->RunTime->User
    ->SwitchContinuations.AddHead(
    m_cCallingLocation);
return Switch;
```

The next level of structure above single commands in a Gerbil script is a CConditionActionBlock. A CConditionActionBlock consists of a condition and a body consisting of a list of commands. When the CConditionActionBlock is executed, the condition is first evaluated. If it is false, the block returns NotActivated immediately. Otherwise, the body statements are executed in order (normally starting with the first statement, but starting with a later statement if the block is part of an active Continuation) until one returns a CABlockEnd value other than Continue. When some other CABlockEnd value is returned, it is passed on as the return value of the CConditionActionBlock.

A CCategory contains an ordered list of CConditionActionBlock objects, and is executed by executing the blocks in succession (normally starting with the first block, but starting with a later block if the CCategory is part of an active Continuation.) If a block returns the value NextCategory, Switch, SwitchBack, Waiting, Done, or RunTimeError, execution of the CCategory stops and the return value is passed on. If a block returns NotActivated, the next block is executed. If a block returns Continue, the next block is activated unless it is an Otherwise block or unless both the current and next blocks are IfChance blocks, in which case it and all other IfChance blocks immediately following it are skipped. If the last block in the category returns Continue or NotActivated, execution of the category is complete and the value NextCategory is returned. Meanwhile, if the category is a standard category, any output command (currently all variants of "Say" or "Do") will cause a flag to be set in the category. If this flag is set at the end of CCategory::Run, the category is appended to the end of RunTime->FocusList so that it will be automatically moved to the front of the focus of attention list. Furthermore, the subjects associated with the category are appended to the list RunTime->M_saActivatedSubjects. This automatic focus allows the attention focus mechanism to function even without the use of Focus statements. It will be appreciated that other implementations might decide whether a topic should be automatically focused in a different way, for example by automatically focusing on any topic in which the condition in at least one CConditionActionBlock has value true, or any topic in which any action is executed.

This behavior can be overridden by including the command DontFocus in any of the blocks that should not trigger the automatic focus mechanism. Furthermore, if the category is given a list of SUBJECTS in the Gerbil script, when the category is focused using automatic focus, all other categories that share at least one SUBJECT with said category are also appended to the end of RunTime->FocusList and will be automatically moved to the front of the focus of attention list.

When a user enters an input, the function CProgram::Run is called. This function does a number of low-level tasks (such as setting RunTime->User) and then executes the Gerbil program. First, it clears FocusList and m_slActivatedSubjects so that it can keep track of categories that are focused on during the execution. To prevent possible ambiguities in the ordering of category executions, Focusing actions do not have any effect until the script is finished executing on the current input. It will be appreciated that other implementations of an attention focus mechanism might dynamically reorder the attention focus list during the processing of an input.

The CProgram is executed by repeatedly selecting and executing categories, as shown in the code fragment below from CProgram::Run. RunTime->ActivePriority and RunTime->ActiveCatPos are used to keep track of what category is currently being executed. Once execution is complete, RunTime->FocusList is used to move those categories that were activated or focused on during execution to the front of the Focus of Attention, focusing the robot's attention on these categories. The function CProgram::Refocus itself is straightforward, simply going through RunTime->FocusList, and for each element, removing it from its previous position in the attention focus list and placing it at the front of the list. If the list RunTime->m_saActivatedSubjects is non-empty, CProgram::Refocus also updates the active subject map for the current user, clearing the map and replacing it with the contents of RunTime->m_saActivatedSubjects.

```
//mark all categories as un-executed
ThisUser->AttentionFocus.MarkUndone();
ProgramExecutable->PriorityCategories.MarkUndone();
ProgramExecutable->DefaultCategories.MarkUndone();
ProgramExecutable->SequenceCategories.MarkUndone
   ();
//Clean up focus list and do a bunch of other initialization
   tasks
RunTime->InitializeForRun();
//Execute all of the categories, in order.
CABlockEnd RetunVal=NextCategory;
CCategory* ActiveCategory=GetNextCategory(ThisDoc,
   ThisUser,
   ExecutionType, ReturnVal);
while (ActiveCategory!=NULL){
   ReturnVal=ActiveCategory->Run(ThisDoc);
   ActiveCategory=GetNextCategory(ThisDoc,
      ThisUser, ExecutionType, ReturnVal);
}
```
//(other tasks done here such as handling output buffers)
//handle all focusing actions Refocus();

Most of the work involved in deciding which categories to execute is done inside of CProgram::GetNextCategory. GetNextCategory uses RunTime->ActivePriority, RunTime->ActiveCatPos, and the RetunVal from the previous category, and selects the next category to execute. If ReturnVal is NextCategory, the program will simply select the next category from the CategoryList for the current ActivePriority (Priority, Standard, or Default), according to the selection mechanism operative for that category and switching to the next priority level if necessary. (Recall that the Priority and Default categories are found in the CExeStruct, while the standard categories are found in RunTime->User->AttentionFocus. Sequence categories are never executed unless activated with a SwitchTo command, so the list ExeProg->SequenceCategories is never executed directly.) If there is an active CContinuation remaining from a previous execution (due to a WaitForResponse), it is activated immediately after the Priority categories. CContinuations are activated by returning the appropriate category and setting RunTime->Continuation, which will cause execution of the category to begin at the appropriate place within the category rather than the beginning.

If ReturnVal is Switch, the target category (from RunTime->SwitchToCategory) is selected. If ReturnVal is SwitchBack, the first CContinuation from SwitchContinuations is removed from the stack and used to choose a category and set up a continuation, and set RunTime->ActiveCatPos when necessary. (Since SwitchBack can only be used within a Sequence category, there is guaranteed to be at least one continuation in SwitchContinuations. The process is equivalent to the method of returning from a subroutine in other programming languages.) If ReturnVal is Waiting, execution ceases since a WaitForResponse has been executed. Similarly, if ReturnVal is RunTimeError, execution ceases and the stack of SwitchContinuations and SequenceContinuations is cleared. (RunTimeError is presently returned only in the event of a SwitchTo cycle violation.) Finally, if ReturnVal is Done (recall that a category cannot return value NotActivated or Continue), execution stops unless there was an InterruptSequence that has not yet been resumed. Recall that InterruptSequence stops execution of a Sequence category while all of the Standard and Default categories are executed, and then resumes execution of the Sequence category. Therefore, if a Done is reached while there is at least one CContinuation in the SequenceContinuations stack, that Sequence category is resumed. In the case where there is no SequenceContinuation, the SwitchContinuations stack can also be cleared, as there is no possibility of returning from any SwitchTo statements once a Done (that is not ending an interruption) is executed.

IV. IMPLEMENTATION OF THE CONTEXT-TESTING MECHANISM

A. OVERVIEW

The condition Focused can be included in the BOT script by the BOT author, in the same way that other conditions such as Heard and Recall are used. Conceptually, the Focused condition is intended to be true whenever the category in which it is included is relevant to the current conversation. More specifically, the Focused condition can only be true in categories that have one or more subjects assigned using the Subjects keyword. The Focused condition is true if one or more of the subject keywords associated with the category are "active subjects". The set of active subjects is the set of subject keywords associated with the most recent input that was processed and resulted in at least one topic associated with a subject being focused, either automatically or through a FOCUS command, as well as subject keywords focused using a FOCUS SUBJECTS command. All subjects associated with each topic that was focused are included in this set of active subjects. Thus, a topic that does not contain any subject keywords does not change the set of active subjects. For instance, a default response such as "I don't know" might not have any associated subjects, and therefore would not change the subject of the current conversation. Thus, the user can ask a question after such a default response and assume that the bot will "remember" what the context of the question was.

In the present implementation of the mechanism, the user record structure for each user conversing with the BOT contains a mapping m_mspActiveSubjects that contains an entry for each currently active subject. These entries actually map to NULL pointers; the map structure is used for efficient lookup. When one or more categories are activated or focused using a FOCUS command, and at least one of these categories is associated with one or more subject keywords, or a FOCUS SUBJECTS command is executed, this map is cleared and a new entry is made for each such keyword. When all of the categories that are activated by an input are not associated with any keywords, the map m_mspActiveSubjects remains unchanged. It will be appreciated by one skilled in the art that this set of active subjects might instead be stored as an ordered list or in an array, and that the scope of the present invention should not be limited to any particular such implementation. Similarly, other reasonable protocols might be used to update this map, including clearing the map when a category without subject keywords is activated, or keeping the subject keywords from two or more previous category activations rather than only the most recent, and that the scope of the present invention should not be limited to the particular protocol described above.

In the compiled BOT object created from the script, each Focused condition is represented as follows:

```
class CFocusCondition: public CCondition
{
public:
        CCategory*      m_pcCategory;
        BOOL            m_bIsOptional;
        BOOL            Evaluate(CGRBLToolDoc* Context);
        void            ProduceFailureWarning(
                                CGRBLToolDoc* Context);
        LPCTSTR         Name() {return "Focused";};
        CActionType WhatItIs() {return ActIfFocused;};
        BOOL            ContainsStar() {return FALSE;};
        void            MakeOptional();
        CFocusCondition() {
            m_bIsOptional = FALSE;
            m_pcCategory = NULL;
        };
};
```

One element of the Focused condition object is the pointer m_pcCategory to the category that contains it. In order to evaluate the condition, the system examines each of the elements of the array of subject names found in the category m_pcCategory. Each of these names is looked up in the map m_mspActiveSubjects for the current user. If one or more of the names is found in the map, the Focused condition is true; otherwise, it is false. It will be appreciated that other methods of evaluating Focused conditions would be apparent to one skilled in the art, such as directly maintaining a list of all categories in which a Focused condition is true, and that the scope of the present invention should not be limited to the particular implementation disclosed above. It will likewise be appreciated that other forms of conditions apart from Boolean conditions, such as fuzzy logic conditions, modal logic conditions, are well known to those skilled in the art and are hereby subsumed by the scope of the present invention.

In the present implementation of the mechanism, each Focused condition is included in the best-fit matching selection structure as a run-time BaseLevelCondition. The value of these conditions can be computed using a run-time matching object, but these values are not computed unless the block containing the Focused keyword is activated by some other condition. Since there may be many topics containing Focused conditions, it is more efficient to compute the values of each such condition only when needed. Each Focused BaseLevelCondition includes an array of the subject names associated with the category containing the condition; this array can be used at run-time to evaluate the condition when needed. It will be appreciated that other methods of incorporating Focused conditions into such a best-fit matching structure would be apparent to one skilled in the art and that the scope of the present invention should not be limited to the particular implementation disclosed above.

Like other run-time BaseLevelConditions, Focused conditions in the best-fit matching selection structure are given a compile-time specificity of 0, so that they are never chosen as activators for categories. At run-time, a Focused condition is assigned a specificity of 100 times the number of subjects in common between the category containing it and the currently active subjects. Focused conditions are deliberately assigned a low specificity value so that they do not interfere with more specific answers to user questions. It will be appreciated that other ways of assigning specificity values to Focused conditions could also be used. In particular, if an ordered active subjects list is maintained, the specificity of a Focused condition could depend on the position in which the subjects in the category containing appear in the active subjects list.

In certain cases, particularly when there is more than one subject in the active subjects list, the use of Focused conditions may result in two or more answers with identical specificity. In this case, the focus of attention stack will function as disclosed above to select an appropriate response. Suppose the list of active subjects includes both "Walter" and "Scott", and the question "Who is he?" is included in both a "Who is Walter?" and a "Who is Scott?" topic using the Focused keyword in each case. In this case, both possible answers will have the same specificity, so the topic that is nearer the front of the focus of attention will give the answer. The focus of attention stack itself is unaffected by the Focused mechanism.

B. EXAMPLE OF FOCUSED MECHANISM

Having described the architecture of a present embodiment, the operation of the present invention will now be illustrated by describing the execution of an example script. Table 1 above illustrates a BOT script in the present scripting language, using the Focused condition in several places. This simple script answers several questions about the company Neuromedia and the scripting language Gerbil.

For purposes of illustration, assume that a site visitor engages in the following discussion with a site that has implemented the script shown in Table 1.

Transcript of Interaction with Robot incorporating script in Table 1:
User Says: What is Neuromedia?
   Robot Says: Neuromedia is a small corporation that sells bot authoring software
   User Says: where?
   Robot Says: Neuromedia is located in San Francisco
User Says: what is Gerbil?
   Robot Says: Gerbil is a bot-scripting language
User Says: where?
   Robot Says: I don't know what you mean.
User Says: is it easy?
   Robot Says: Yes, Gerbil is very easy to use.
User Says: Give me an example
   Robot Says: Here's a sample of a Gerbil script:
   Robot Says: Topic "Hello World" is
   Robot Says: If Heard "hello" Then
   Robot Says: Say "Hi there!"
   Robot Says: Done
   Robot Says: EndTopic
User Says: Where is Neuromedia
   Robot Says: Neuromedia is located in San Francisco
User Says: What is it?
   Robot Says: Neuromedia is a small corporation that sells bot authoring software.
User Says: Give me an example
   Robot Says: I don't know what you mean.
Execution of the Sample Script in Table 1:
The script shown in Table 1 contains 6 categories: two discussing the subject "Neuromedia", three discussing the subject "Gerbil", and one default topic, with no subject, that simply gives the response "I don't know what you mean." to any question that isn't answered by any of the other topics. It is assumed here that the same user is talking to the robot throughout this example.
   >User Says: What is Neuromedia?
   >Robot Says: Neuromedia is a small corporation that sells bot authoring software
Initially, the active subject map for this user is empty. When the user ask the question "What is Neuromedia?", the only topic that is activated is the "What is Neuromedia?"topic. (This input is handled exactly as it would have been if the script had been written without the use of the present invention; the topic "What is Neuromedia?" is the only topic that would be activated regardless of the contents of the active subject map.) Therefore, the robot gives the response "Neuromedia is a small corporation that sells bot authoring software." Since the topic "What is Neuromedia?" was activated, the subject "Neuromedia" is added to the active subject map for the user. (If the topic included more than one subject, all of these subjects would have been added to the active subject map.)
   >User Says: where?
   >Robot Says: Neuromedia is located in San Francisco
The user now asks the question "where?". This question contains the word "where", so the best-fit selection mechanism activates the second clause of the condition in the topic "Where is Neuromedia?" (i.e. Focused and Heard "where".) It now tests the Focused condition by testing whether any subject of the "Where is Neuromedia?" topic is contained in the active subject map for the current user. In this case, the subject "Neuromedia" is included in the active subject map, so the Focused condition is true, and the category "Where is Neuromedia?" is selected. When the category is actually executed, a similar process is used to evaluate the Focused condition and the robot says "Neuromedia is located in San Francisco." The topic "Where is Neuromedia" contains the subject "Neuromedia" so the active subject map still contains only the single subject "Neuromedia".

Note that this response would be very difficult to produced without the use of a Focused condition. Pronoun replacement clearly could not produce this response, as the input did not contain any pronouns. The focus of attention stack could be used to produce this response, but might also produce the same response if the question "where?" is asked in a different context. As shall be illustrated, the script in Table 1 does not suffer from this problem.
   >User Says: what is Gerbil?
   >Robot Says: Gerbil is a bot-scripting language
The next question, "What is Gerbil?", matches only the topic "What is Gerbil", independent of the set of active subjects. Therefore, the robot produces the response "Gerbil is a bot-scripting language". Since the topic "What is Gerbil" contains at least one subject, the active subject map for the current user is cleared out, and the subject "Gerbil" is added to the map.
   >User Says: where?
   >Robot Says: I don't know what you mean.
The user now repeats the question "where?", but in a different context. Again, the question activates the second clause of the topic "Where is Neuromedia?" within the best-fit selection mechanism. It now tests the Focused condition and discovers that none of the subjects of the topic "Where is Neuromedia?" are found in the active subject map for the current user. Therefore, the Focused condition is false, and the topic "Where is Neuromedia?" is not activated. No other topics are activated by the question "where?", so the robot executes the default topic "I don't know" and produces the response "I don't know what you mean." Since the only topic activated was the "I don't know" topic, and this topic does not contain any subjects, the active subject map for the current user is unchanged (i.e. it still contains the single subject "Gerbil".) Note that without the use of the Focused condition, it would be difficult to avoid having the robot produce the answer "Neuromedia is located in San Francisco" in response to this question.
   >User Says: is it easy?
   >Robot Says: Yes, Gerbil is very easy to use.
The user now asks the question "Is it easy?". The only condition that is activated by this input is the condition (Focused and (Heard "is*it*easy")) in the topic "Is Gerbil easy?". The best-fit matching mechanism now evaluates the Focused condition and determines that it is true, since the topic "Is Gerbil easy.?" is associated with the subject "Gerbil", which is found in the active subject map for the current user. Therefore, the response "Yes, Gerbil is very easy to use." is given. Since the topic "Is Gerbil easy?" contains only the subject "Gerbil", the active subject map remains unchanged.
   >User Says: Give me an example
   >Robot Says: Here's a sample of a Gerbil script:
   >Robot Says: Topic "Hello World" is
   >Robot Says: If Heard "hello" Then
   >Robot Says: Say "Hi there!"
   >Robot Says: Done
   >Robot Says: EndTopic
The user now says "Give me an example". This question activates the condition (Focused and Heard "example") in the topic "Give me an example of Gerbil". Again, the Focused condition is tested and found to be true, since the topic is associated with the subject "Gerbil", which is found in the active subject map for the current user. The response is given, and the active subject map remains unchanged.

>User Says: Where is Neuromedia?

>Robot Says: Neuromedia is located in San Francisco

The user now asks the question "Where is Neuromedia?" This question matches the condition (Heard "where*Neuromedia") in the "Where is Neuromedia" topic, so the answer "Neuromedia is located in San Francisco" is given. The active subject map for the current user is now cleared, and the subject "Neuromedia", from the topic "Where is Neuromedia", is added to the active subject map.

>User Says: What is it?

>Robot Says: Neuromedia is a small corporation that sells bot authoring software.

The user now asks the question "What is it?" This question activates two different conditions, the condition (Focused and Heard "what*it") in the topic "What is Neuromedia", and the identical condition in the topic "What is Gerbil". For the condition within the topic "What is Neuromedia", the Focused condition is tested and found to be true, as the subject "Neuromedia" is in the active subject map. For the condition within the topic "What is Gerbil", the Focused condition is found to be false, since the subject "Gerbil" is not in the active subject map. Therefore, the "What is Neuromedia" topic is the only topic activated, and the answer "Neuromedia is a small corporation that sells bot authoring software" is given. The topic contains the subject "Neuromedia", so the active subject map remains the same.

>User Says: Give me an example

>Robot Says: I don't know what you mean.

Finally, the user repeats the input "Give me an example". Again, this input activates the condition (Focused and Heard "example") within the topic "Give me an example of Gerbil". This time, the Focused condition is tested and found not to be true, since the subject "Gerbil" is not in the active subject map. Therefore, the default topic "I don't know" is executed, and the bot says "I don't know what you mean."

It has thus been shown in this specification various methods and mechanisms for incorporating the context of the conversation when selecting answers for a BOT while interacting with a human user. It will be appreciated that various other embodiments of the present invention are possible and known to those skilled in the art and that the scope of the present invention includes such other embodiments.

What is claimed is:

1. A method for testing the context of an input when selecting a set of categories to activate in an automated interface program designed to interact and communicate with users, said method comprising:

(a) defining at least one category associated with actions executed by the automated interface program during interaction with a user, wherein one or more subjects may be associated with the at least one category, and wherein the at least one category includes a focused condition;

(b) maintaining a list of the subjects associated with the most recently activated set of categories;

(c) receiving natural language input from a user;

(d) activating a category if the focused condition of the category matches the input and the subject associated with the category is on the list of the subjects associated with the most recently activated set of categories; and (e) selecting one or more activated categories for execution by the automated interface program.

2. The method for testing the context of an input when selecting a set of categories to activate as recited in claim 1 wherein step (a) further comprises:

associating subject keywords with categories by including said keywords in a script language defining said categories.

3. The method for testing the context of an input when selecting a set of categories to activate as recited in claim 1 wherein step (b) further comprises:

(i) upon a user input, finding the set of activated categories; and (ii) finding the set of subject keywords associated with said set of categories found in step (i).

4. The method for testing the context of an input when selecting a set of categories to activate as recited in claim 1 wherein said set of categories further comprises priority categories.

5. The method for testing the context of an input when selecting a set of categories to activate as recited in claim 1 wherein said set of categories further comprises default categories.

6. The method for testing the context of an input when selecting a set of categories to activate as recited in claim 1 wherein said set of categories further comprises standard categories.

7. The method for testing the context of an input when selecting a set of categories to activate as recited in claim 1 wherein the step of testing conditions in said categories further comprises:

testing each said category having said condition in order of execution.

8. A system for testing the context of an input when selecting a set of categories to activate in an automated interface program designed to interact and communicate with users, said system comprising:

(a) means for defining at least one category associated with actions executable by the automated interface program during interaction with a user, wherein one or more subjects may be associated with the at least one category, and wherein the at least one category includes a focused condition;

(b) means for maintaining a list of the subjects associated with the most recently activated set of categories;

(c) means for receiving natural language input from a user;

(d) means for activating a category if the focused condition of the category matches the input and the subject associated with the category is on the list of the subjects associated with the most recently activated set of categories; and (e) means for selecting one or more activated categories for execution by the automated interface program.

9. A mechanism for placing conditions within scripts defining categories that allow the BOT to determine whether a particular category is appropriate to a current conversation with a user, said mechanism comprising:

(a) means for including said conditions in a BOT script defining a category associated with actions executable by the automated interface program during interaction with a user, wherein one or more subject keywords may be associated with the category, said conditions relating subject keywords to said category;

(b) means for maintaining an active subjects list comprising subject keywords associated with categories;

(c) means for activating one or more categories upon a user input when conditions associated with actions associated with the one or more categories are satisfied, wherein said conditions are satisfied if a subject keyword associated with a category matches a subject keyword on the active subjects list; and (d) means for selecting one or more activated categories for execution by the automated interface program.

10. A method for identifying the context of input received from a user in an automated interface program, wherein the context of the received user input influences the generation of contextually pertinent output in the automated interface program, the method comprising:

defining at least one category associated with actions executable by the automated interface program during interaction with a user, wherein one or more subjects may be associated with the at least one category;

maintaining an active subject list comprising subjects associated with the at least one category;

receiving user input;

activating the at least one category if the at least one category matches the received user input, wherein the activation of the at least one category is influenced by an association of the at least one category with a subject on the active subject list;

updating the active subject list; and selecting one or more activated categories for execution by the automated interface program.

11. The method for identifying the context of input received from a user in an automated interface program as recited in claim 10, wherein the step of updating the active subject list further comprises adding subjects associated with activated categories to the active subject list.

12. The method for identifying the context of input received from a user in an automated interface program as recited in claim 11, wherein the step of updating the active subject list further comprises clearing the active subject list prior to updating the active subject list.

13. The method for identifying the context of input received from a user in an automated interface program as recited in claim 10, wherein the step of defining at least one category further comprises defining a priority category type wherein a priority category is examined before categories of other types.

14. The method for identifying the context of input received from a user in an automated interface program as recited in claim 10, wherein the step of defining at least one category further comprises defining a default category type wherein a default category is examined after categories of other types.

15. The method for identifying the context of input received from a user in an automated interface program as recited in claim 14, wherein a default category is examined if no actions are executed in association with another category.

16. The method for identifying the context of input received from a user in an automated interface program as recited in claim 10, wherein the step of defining at least one category further comprises defining a standard category type, wherein a standard category is examined after all priority categories are examined and before any default category is examined.

17. The method for identifying the context of input received from a user in an automated interface program as recited in claim 10, wherein the step of defining at least one category further comprises defining a sequence category type, wherein a sequence category is examined only when a request to examine the sequence category is executed in association with another category.

18. The method for identifying the context of input received from a user in an automated interface program as recited in claim 17, further comprising the steps of:

executing one or more actions associated with an examined sequence category;

receiving additional user input;

examining one or more priority categories in response to the additional user input, wherein actions associated with a priority category that matches the additional user input are executed; and executing one or more unexecuted actions associated with the examined sequence category.

19. The method for identifying the context of input received from a user in an automated interface program as recited in claim 17, further comprising the steps of:

executing one or more actions associated with an examined sequence category;

identifying a second category that matches a natural language component within the natural language input;

executing one or more actions associated with the second category; and executing one or more unexecuted actions associated with the examined sequence category.

20. The method for identifying the context of input received from a user in an automated interface program as recited in claim 10, further comprising the step of maintaining a category data structure comprising category entries, wherein a category entry is associated with the at least one category and includes subjects associated with the at least one category.

21. The method for identifying the context of input received from a user in an automated interface program as recited in claim 10, wherein updating the active subject list further comprises maintaining the current state of the active subject list when there are no subjects associated with categories activated by the received user input.

22. The method for identifying the context of input received from a user in an automated interface program as recited in claim 10, wherein an action associated with the at least one category and executable by the automated interface program may comprise an explicit focusing mechanism.

23. The method for identifying the context of input received from a user in an automated interface program as recited in claim 22, wherein the explicit focusing mechanism may comprise a focus command associated with a category.

24. The method for identifying the context of input received from a user in an automated interface program as recited in claim 23, wherein the step of updating the active subjects list further comprises adding to the active subjects list subjects associated with a category associated with an executed focus command.

25. The method for identifying the context of input received from a user in an automated interface program as recited in claim 22, wherein the explicit focusing mechanism may comprise a focus subjects command associated with one or more subjects.

26. The method for identifying the context of input received from a user in an automated interface program as recited in claim 25, wherein the step of updating the active subjects list further comprises adding to the active subjects list the subjects associated with an executed focus subjects command.

27. The method for identifying the context of input received from a user in an automated interface program as recited in claim 25, wherein the step of updating the active subjects list further comprises adding subjects associated with categories associated with the one or more subjects associated with an executed focus subjects command.

28. The method for identifying the context of input received from a user in an automated interface program as recited in claim 10, wherein an executable action associated with the at least one category may be associated with a condition, wherein the condition is associated with a specificity value, wherein the specificity value influences the selection of activated categories for execution by the automated interface program.

29. The method for identifying the context of input received from a user in an automated interface program as recited in claim 28, wherein the condition may comprise a focused condition, wherein a focused condition is true if one or more subjects associated with the at least one category are included in the active subjects list.

30. The method for identifying the context of input received from a user in an automated interface program as recited in claim 29, wherein the specificity value of a focused condition is influenced by the number of subjects associated with the category associated with the focused condition that also appear in the subjects included in the active subjects list.

31. A system for identifying the context of input received from a user in an automated interface program, wherein the context of the received user input influences the generation of contextually pertinent output in the automated interface program, the system comprising:

an interface configured to receive input from a user;

an active subject list comprising a data structure having zero or more subjects;

a processor comprising a computer useable medium including computer readable program code embodied in the medium configured to interact with a user, the computer readable program code including:

computer readable program code configured to define at least one category associated with actions executable by the automated interface program during interaction with a user, wherein one or more subjects may be associated with the at least one category;

computer readable program code configured to activate at least one category if the at least one category matches the received user input, wherein the activation of the at least one category is influenced by an association of the at least one category with a subject on the active subject list;

computer readable program code configured to update the active subject list; and computer readable program code configured to select one or more activated categories for execution by the automated interface program.

32. A computer program product for identifying the context of input received from a user in an automated interface program, wherein the context of the input influences the generation of contextually pertinent output in the automated interface program, the computer program product comprising:

an interface configured to receive input from a user;

an active subject list comprising a data structure having zero or more subjects;

computer readable program code configured to define the at least one category associated with actions executable by the automated interface program during interaction with a user, computer readable program code configured to activate the at least one category if the at least one category matches the received user input, wherein the activation of the at least one category may be influenced by an association of the at least one category with a subject on the active subject list;

computer readable program code configured to update the active subject list; and computer readable program code configured to select one or more activated categories for execution by the automated interface program.

* * * * *